United States Patent
Kang et al.

(10) Patent No.: US 9,973,618 B2
(45) Date of Patent: May 15, 2018

(54) METHOD FOR CONTROLLING DISPLAY USING SENSOR DATA AND ELECTRONIC DEVICE THEREOF

(71) Applicant: Samsung Electronics Co., Ltd., Gyeonggi-do (KR)

(72) Inventors: Jeong Gwan Kang, Gyeonggi-do (KR); Byungjun Lee, Gyeonggi-do (KR); Hyunsu Hong, Gyeonggi-do (KR); Narin Kim, Seoul (KR); Yunhwa Seo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days. days.

(21) Appl. No.: 15/438,293

(22) Filed: Feb. 21, 2017

(65) Prior Publication Data
US 2017/0244827 A1    Aug. 24, 2017

(30) Foreign Application Priority Data
Feb. 19, 2016    (KR) .................. 10-2016-0020040

(51) Int. Cl.
*H04M 1/72*    (2006.01)
*H04W 52/02*    (2009.01)
(Continued)

(52) U.S. Cl.
CPC ........ *H04M 1/72569* (2013.01); *H04L 67/26* (2013.01); *H04M 1/72583* (2013.01);
(Continued)

(58) Field of Classification Search
CPC ......... H04M 1/72569; H04M 1/72583; H04M 2250/12; H04L 67/26; H04W 68/005; H04W 88/02; H04W 52/02; G06F 1/1626; G06F 1/169; G06F 3/044; G06F 1/3203
See application file for complete search history.

(56) References Cited

U.S. PATENT DOCUMENTS

2001/0024967 A1    9/2001    Bauer
2004/0212586 A1*   10/2004   Denny .................. G06F 1/1626
                                                          345/156
(Continued)

FOREIGN PATENT DOCUMENTS

JP    2006211421    8/2006
KR    20010067462   7/2001
(Continued)

OTHER PUBLICATIONS

International Search Report dated May 31, 2017 issued in counterpart application No. PCT/KR2017/001574, 10 pages.

*Primary Examiner* — Pablo Tran
(74) *Attorney, Agent, or Firm* — The Farrell Law Firm, P.C.

(57) ABSTRACT

An electronic device and its operating method are provided. The method includes, while a display displays content, identifying, by a first processor, state information of the electronic device using a first sensor based on a first cycle, determining, by the first processor, whether the state information is maintained using the first sensor based on a second cycle, when determining that the state information is maintained based on the second cycle, providing, by the first processor to a second processor, first notification information corresponding to the determination, and changing, by the second processor, a state of the display in response to the first notification information.

20 Claims, 14 Drawing Sheets

(51) Int. Cl.
  *H04W 68/00* (2009.01)
  *H04W 28/02* (2009.01)
  *H04M 1/725* (2006.01)
  *H04L 29/08* (2006.01)

(52) U.S. Cl.
  CPC ..... *H04W 52/027* (2013.01); *H04W 52/0251* (2013.01); *H04W 68/005* (2013.01); *H04M 2250/12* (2013.01); *H04M 2250/22* (2013.01); *H04W 28/0221* (2013.01); *Y02B 60/50* (2013.01)

(56) References Cited

U.S. PATENT DOCUMENTS

| | | | |
|---|---|---|---|
| 2005/0275651 A1* | 12/2005 | Plut | G06F 1/3218 345/211 |
| 2007/0054651 A1* | 3/2007 | Farmer | H04B 1/1615 455/352 |
| 2007/0195074 A1* | 8/2007 | Gelissen | G06F 1/3228 345/204 |
| 2008/0106531 A1* | 5/2008 | Hullot | H04M 1/72544 345/204 |
| 2012/0191993 A1 | 7/2012 | Drader et al. | |
| 2013/0084922 A1 | 4/2013 | Liu et al. | |
| 2014/0281617 A1 | 9/2014 | Hobbs et al. | |
| 2015/0230183 A1 | 8/2015 | Stogaitis | |
| 2015/0301588 A1 | 10/2015 | Jeong et al. | |

FOREIGN PATENT DOCUMENTS

| | | |
|---|---|---|
| KR | 20150056017 | 5/2015 |
| KR | 1020150121559 | 10/2015 |

\* cited by examiner

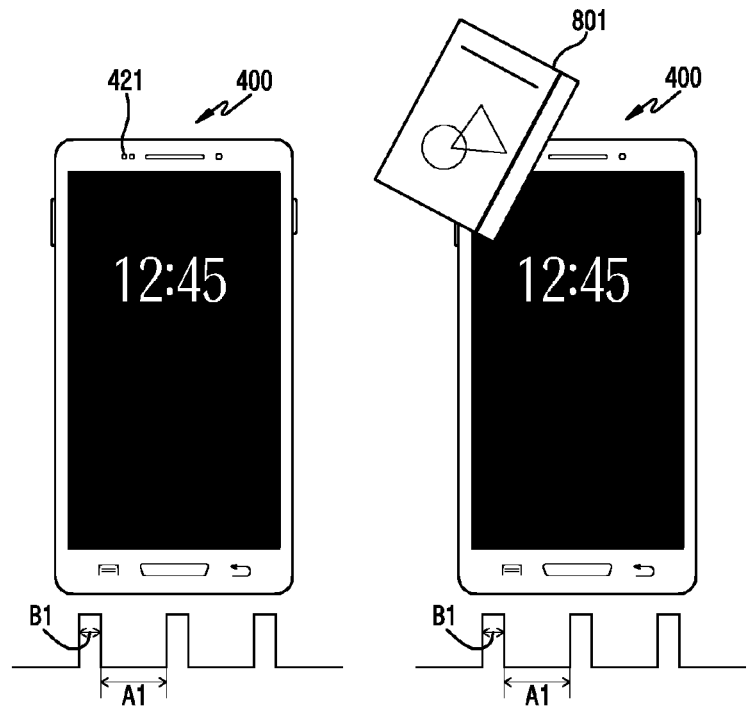
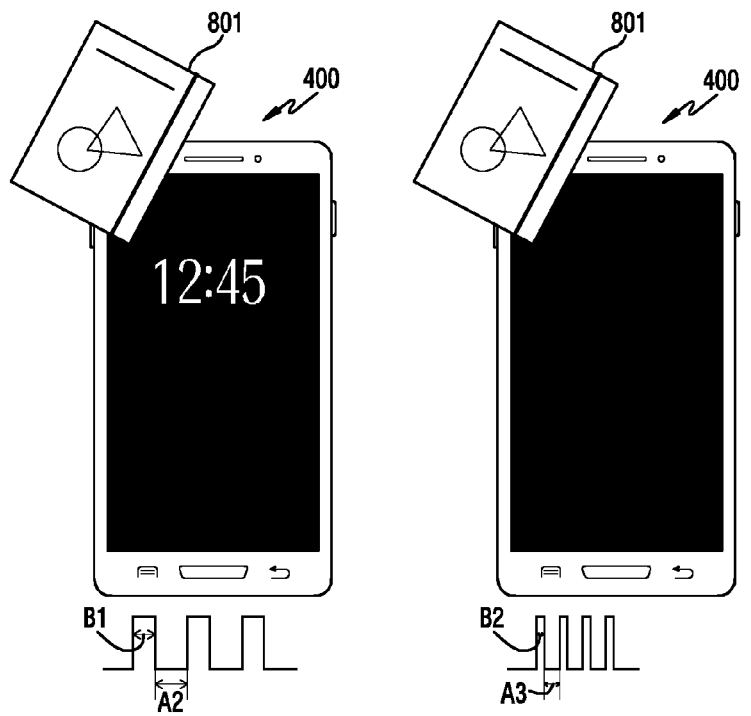
FIG.8A  FIG.8B
FIG.8C  FIG.8D

METHOD FOR CONTROLLING DISPLAY USING SENSOR DATA AND ELECTRONIC DEVICE THEREOF

PRIORITY

The present application claims priority under 35 U.S.C. § 119(a) to a Korean Patent Application filed in the Korean Intellectual Property Office on Feb. 19, 2016, and assigned Serial No. 10-2016-0020040, the entire content of which is incorporated herein by reference.

BACKGROUND

1. Field of the Disclosure

The present disclosure relates generally to an electronic device and its operating method.

2. Description of Related Art

To prevent unnecessary activation of the display of an electronic device, the electronic device may set an operation time of the display and deactivate the display in response to receiving no input during a particular time. However, when the electronic device is flipped over or put in a bag, the display may be unnecessarily activated.

SUMMARY

The present disclosure has been made to address at least the above-mentioned problems and/or disadvantages and to provide at least the advantages described below.

Accordingly, an aspect of the present disclosure is to provide an electronic device for controlling a display by checking its state and/or a user's action using at least one sensor of the electronic device.

Accordingly, another aspect of the present disclosure is to obtain state information of the electronic device and/or the user's behavior using data measured by at least one sensor of the electronic device, and to minimize unnecessary power consumption by controlling the display of the electronic device based on the obtained state information.

In accordance with an aspect of the present disclosure, a method for operating an electronic device is provided. The method includes, while a display displays contents, identifying, by a first processor, state information of the electronic device using a first sensor based on a first cycle, determining, by the first processor, whether the state information is maintained using the first sensor based on a second cycle, when determining that the state information is maintained based on the second cycle, providing, by the first processor to a second processor, first notification information corresponding to the determination, and changing, at the second processor, a state of the display in response to the first notification information.

In accordance with another aspect of the present disclosure, an electronic device is provided. The electronic device includes a sensor unit including a first sensor and a second sensor, a display for displaying contents, a first processor for controlling the sensor unit, and a second processor for controlling the display. While the display displays the contents, the first processor identifies state information of the electronic device using the first sensor of the sensor unit based on a first cycle, determines whether the state information is maintained using the first sensor based on a second cycle, and when determining that the state information is maintained based on the second cycle, provides first notification information corresponding to the determination to the second processor. The second processor changes a state of the display in response to the first notification information.

In accordance with another aspect of the present disclosure, a non-transitory, computer-readable recording medium having recorded thereon, instructions, which when executed by at least one processor of an electronic device, performs the steps of, while a display displays contents, identifying, by a first processor, state information of the electronic device using a first sensor based on a first cycle, determining, by the first processor, whether the state information is maintained using the first sensor based on a second cycle, when determining that the state information is maintained based on the second cycle, providing, by the first processor to a second processor, first notification information corresponding to the determination, and changing, by the second processor, a state of the display in response to the first notification information.

BRIEF DESCRIPTION OF THE DRAWINGS

The above and other aspects, features, and advantages of the present disclosure will be more apparent from the following description taken in conjunction with the accompanying drawings, in which:

FIGS. 8A to 8D illustrate various displays of an electronic device, according to an embodiment of the present disclosure;

DETAILED DESCRIPTION OF EMBODIMENTS OF THE PRESENT DISCLOSURE

Figure 1:
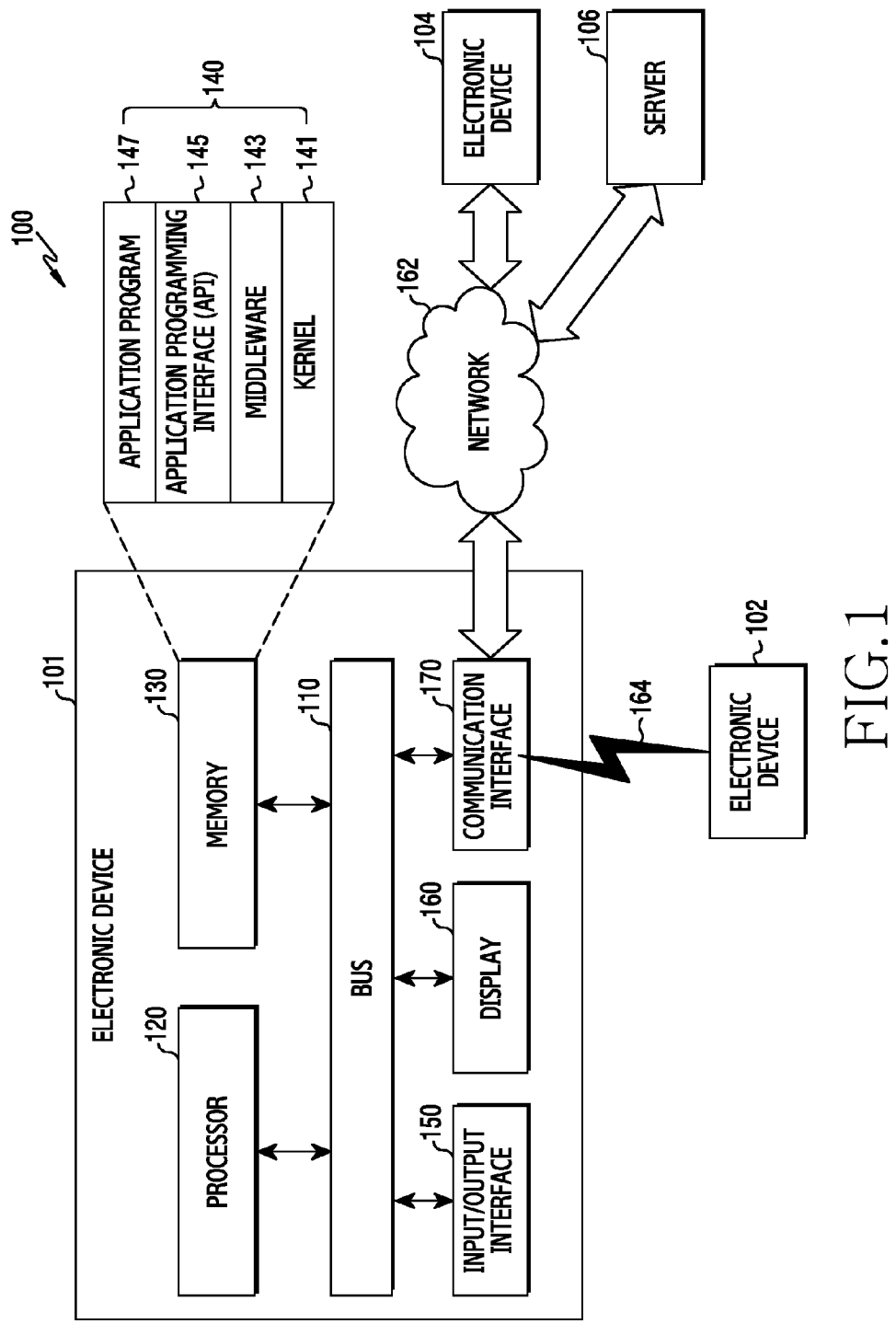
FIG. 1 is a block diagram of a network environment including an electronic device, according to an embodiment of the present disclosure.

Embodiments of the present disclosure are described in detail with reference to the accompanying drawings, in which similar reference numerals may be used to refer to similar elements. However, it should be understood that there is no intent to limit the present disclosure to the particular forms disclosed herein; rather, the present disclosure should be construed to cover various modifications, equivalents, and/or alternatives of embodiments of the present disclosure.

In the present disclosure, a singular expression may include a plural expression, unless otherwise specified.

In the present disclosure, the expressions "A or B," "at least one of A and B," and "one or more of A and B" may include all possible combinations of the listed items. Expressions such as "first," "second," "primarily," and "secondary," as used herein, may represent various elements regardless of order and/or importance and do not limit the corresponding elements. The expressions may be used for distinguishing one element from another element. When an element (such as a first element) is described as being "coupled" or "connected" to another element (such as a second element), the element can be directly connected to the other element or can be connected through another element (such as a third element). In contrast, when an element (such as a first element) is referred to as being "directly coupled" or "directly connected" to another element (such as a second element), it should be understood that there are no intervening element (such as a third element).

The expression "configured to (or set)" may be used interchangeably with, for example, the expression "suitable for," "having the capacity to," "designed to," "adapted to," "made to," or "capable of" according to a situation. The expression "configured to (or set)" does not only mean "specifically designed to" by hardware. Alternatively, in some situations, the expression "apparatus configured to" may indicate that the apparatus "can" operate together with another apparatus or component. For example, the phrase "a processor configured (or set) to perform A, B, and C" may refer to a generic-purpose processor (such as a central processing unit (CPU) or an application processor) that can perform a corresponding operation by executing at least one software program stored at an exclusive processor (such as an embedded processor) for performing a corresponding operation or at a memory device.

An electronic device, according to an embodiment of the present disclosure, may be at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MPEG 3 (MP3) player, a medical equipment, a camera, and a wearable device. The wearable device can include at least one of an accessory type (e.g., a watch, a ring, a bracelet, an ankle bracelet, a necklace, glasses, a contact lens, or a head-mounted-device (HMD)), a fabric or clothing embedded type (e.g., electronic garments), a body attachable type (e.g., a skin pad or a tattoo), and an implantable circuit.

An electronic device may be embodied as at least one of, for example, a television, a digital versatile disc (DVD) player, an audio device, a refrigerator, an air-conditioner, a cleaner, an oven, a microwave oven, a washing machine, an air cleaner, a set-top box, a home automation control panel, a security control panel, a media box (e.g., Samsung Home-Sync™, Apple TV™, or Google TV™), a game console (e.g., Xbox™, PlayStation™), an electronic dictionary, an electronic key, a camcorder, and an electronic frame.

An electronic device may be at least one of a medical device (such as, a portable medical measuring device (e.g., a blood sugar measuring device, a heartbeat measuring device, a blood pressure measuring device, or a body temperature measuring device), a magnetic resonance angiography (MRA) device, a magnetic resonance imaging (MRI) device, a computed tomography (CT) device, a scanning machine, or an ultrasonic wave device), a navigation device, a global navigation satellite system (GNSS), an event data recorder (EDR), a flight data recorder (FDR), a vehicle infotainment device, electronic equipment for a ship (such as, a navigation device for a ship and gyro compass), an avionics device, a security device, a head unit for a vehicle, an industrial or home robot, a drone, an automated teller machine (ATM), a point of sales (POS) device, and an Internet of Things (IoT) device (e.g., a light bulb, a sensor, a sprinkler device, a fire alarm, a thermostat, a street light, a toaster, sports equipment, a hot water tank, a heater, or a boiler).

An electronic device may at least one of a portion of furniture, building/construction, or vehicle, an electronic board, an electronic signature receiving device, a projector, and a measuring device (e.g., water supply, electricity, gas, or electric wave measuring device).

An electronic device can be a flexible electronic device or a combination of two or more of the foregoing various devices.

An electronic device of the present disclosure is not limited to the foregoing devices and may be a newly developed electronic device.

The term "user", as used herein, can refer to a person using an electronic device or a device using an electronic device (e.g., an artificial intelligence electronic device).

FIG. 1 is a block diagram of a network environment including an electronic device, according to an embodiment of the present disclosure.

Referring to FIG. 1, an electronic device 101 in a network environment 100 is provided. The electronic device 101 includes a bus 110, a processor 120, a memory 130, an input/output interface 150, a display 160, and a communication interface 170. The electronic device 101 may be provided without at least one of the components, or may include at least one additional component.

The bus 110 is a circuit for connecting the components 120 through 170 and delivering communication signals (e.g., control messages or data) therebetween.

The processor 120 can include one or more of a CPU, an application processor, and a communication processor (CP). The processor 120 can perform an operation or data processing with respect to control of and/or communication with the other components of the electronic device 101.

The memory 130 can include a volatile and/or nonvolatile memory. The memory 130 can store commands or data relating to the other components of the electronic device 101. The memory 130 can store software and/or a program 140. The program 140 includes a kernel 141, middleware 143, an application programming interface (API) 145, and/or an application program 147. At least part of the kernel 141, the middleware 143, or the API 145 can be referred to as an operating system (OS). The kernel 141 can control or manage system resources (e.g., the bus 110, the processor 120, or the memory 130) used for performing operations or functions implemented by the other programs (e.g., the middleware 143, the API 145, or the application program 147). Additionally, the kernel 141 can provide an interface for allowing the middleware 143, the API 145, or the application program 147 to access an individual component of the electronic device 101 to control and manage system resources.

The middleware 143 can serve an intermediary role for communicating with and exchanging data between the API 145 or the application program 147 and the kernel 141. Additionally, the middleware 143 can process one or more job requests received from the application program 147, based on their priority. For example, the middleware 143 can assign a priority for using a system resource (e.g., the bus 110, the processor 120, or the memory 130) of the electronic device 101 to at least one of the application program 147, and process the one or more job requests according to the priority.

The API 145, as an interface through which the application 147 controls a function provided from the kernel 141 or the middleware 143, can include at least one interface or function (e.g., an instruction) for file control, window control, image processing, or character control. The input/output interface 150 can deliver commands or data inputted from a user or another external device to other components of the electronic device 101, or output commands or data inputted from the other components of the electronic device 101 to the user or another external device.

The display 160 can include a liquid crystal display (LCD), a light emitting diode (LED) display, an organic light emitting diode (OLED) display, a microelectromechanical systems (MEMS) display, or an electronic paper display. The display 160 can display various contents (e.g., texts, images, videos, icons, and/or symbols) to the user. The display 160 can include a touch screen and receive touch, gesture, proximity, or hovering inputs by using an electronic pen or a user's body part.

The communication interface 170 can set a communication between the electronic device 101 and a first external electronic device 102, a second external electronic device 104, or a server 106. For example, the communication interface 170 can communicate with the first external electronic device 102 through short range communication 164, and can communicate with the second external electronic device 104 or the server 106 over a network 162 through wireless communication or wired communication.

The wireless communication can include cellular communication using at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wireless communication can include at least one of Wi-Fi, bluetooth, bluetooth low energy (BLE), zigbee, near field communication (NFC), magnetic secure transmission, radio frequency (RF), global navigation satellite system (GNSS), and body area network (BAN). The GNSS can include global positioning system (GPS), global navigation satellite system (GLONASS), Beidou navigation satellite system (Beidou), or Galileo (the European global satellite-based navigation system). Hereafter, the term GPS can be used interchangeably with the term GNSS.

The wired communication can include at least one of universal serial bus (USB), high definition multimedia interface (HDMI), recommended standard 232 (RS-232), power line communications, and plain old telephone service (POTS). The network 162 can include a telecommunications network at least one of computer network (e.g., local area network (LAN) or a wide area network (WAN)), the Internet, and telephone network.

Each of the first and second external electronic devices 102 and 104 can be of the same type as or of a different type from that of the electronic device 101. All or part of operations executed in the electronic device 101 can be executed by the external electronic devices 102 and 104, and/or the server 106. To perform a function or service automatically or by request, instead of performing the function or the service by the electronic device 101, the electronic device 101 can request at least part of a function relating thereto from the external electronic devices 102 and 104, and/or the server 106. The other electronic device can perform the requested function or an additional function and send its result to the electronic device 101. The electronic device 101 can provide the requested function or service by processing the received result. In doing so cloud computing, distributed computing, or client-server computing techniques can be used.

Figure 2:
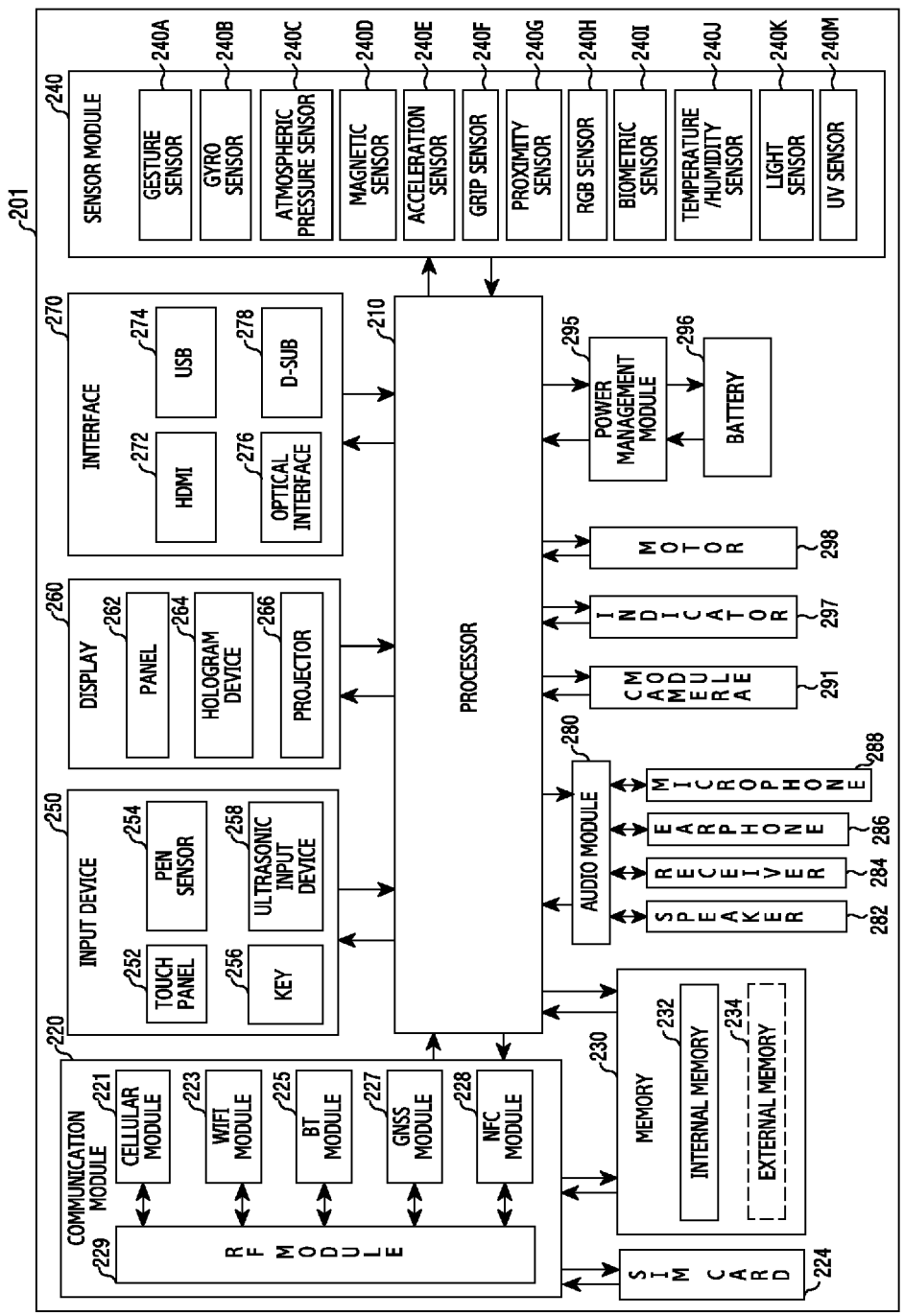
FIG. 2 is a block diagram of a configuration of an electronic device, according to an embodiment of the present disclosure.

FIG. 2 is a block diagram of a configuration of an electronic device, according to an embodiment of the present disclosure.

Referring to FIG. 2, an electronic device 201 is provided. The electronic device 201 includes one or more processors (e.g., an AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 can control a plurality of hardware or software components connected to the processor 210, and also can perform various data processing and operations by executing an OS or an application program. The processor 210 can be implemented with a system on chip (SoC), for example. The processor 210 can further include a graphic processing unit (GPU) and/or an image signal processor. The processor 210 may include at least part (e.g., a cellular module 221) of the components shown in FIG. 2. The processor 210 can load commands or data received from at least one other component (e.g., a nonvolatile memory) into a volatile memory, process them, and store various data in the nonvolatile memory.

The communication module 220 includes the cellular module 221, a Wi-Fi module 223, a bluetooth (BT) module 225, a GNSS module 227, an NFC module 228, and an RF module 229. The cellular module 221 can provide voice call, video call, short message service (SMS), or Internet service through a communication network. The cellular module 221 can identify and authenticate the electronic device 201 in a communication network by using the SIM card 224. The cellular module 221 can perform at least part of a function that the processor 210 provides. The cellular module 221 can further include a CP. At least some of the cellular module 221, the Wi-Fi module 223, the BT module 225, the GNSS module 227, and the NFC module 228 can be included in one integrated circuit (IC) or an IC package. The RF module 229 can transmit/receive a communication signal (e.g., an RF signal). The RF module 229 can include a transceiver, a power amp module (PAM), a frequency filter, a low noise amplifier (LNA), or an antenna. At least one of the cellular module 221, the WiFi module 223, the BT module 225, the GNSS module 227, and the NFC module 228 may transmit/receive an RF signal through an additional RF module.

The SIM 224 can include a card including a SIM or an embedded SIM, and also can contain unique identification information (e.g., an integrated circuit card identifier (IC-CID)) or subscriber information (e.g., an international mobile subscriber identity (IMSI)).

The memory 230 includes at least one of an internal memory 232 and an external memory 234. The internal memory 232 can include at least one of a volatile memory (e.g., dynamic RAM (DRAM), static RAM (SRAM), or synchronous dynamic RAM (SDRAM)), and a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory, a hard drive, and a solid state drive (SSD)). The external memory 234 can include a flash drive a compact flash (CF), a secure digital (SD), a micro SD, a mini SD, an extreme digital (xD), a multi-media card (MMC), or a memory stick. The external memory 234 can be functionally or physically connected to the electronic device 201 through various interfaces.

The sensor module 240 can measure physical quantities or detect an operating state of the electronic device 201, and thus convert the measured or detected information into electrical signals. The sensor module 240 includes at least one of a gesture sensor 240A, a gyro sensor 240B, an atmospheric pressure sensor 240C, a magnetic sensor 240D, an acceleration sensor 240E, a grip sensor 240F, a proximity sensor 240G, a red, green, blue (RGB) sensor 240H, a biometric sensor 240I, a temperature/humidity sensor 240J, a light sensor 240K, and an ultra violet (UV) sensor 240M. Additionally or alternately, the sensor module 240 can include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 can further include a control circuit for controlling at least one sensor therein. The electronic device, as part of the processor 210 or individually, can further include a processor configured to control the sensor module 240 and thus control the sensor module 240 while the processor 210 is sleeping.

The input device 250 includes at least one of a touch panel 252, a (digital) pen sensor 254, a key 256, and an ultrasonic input device 258.

The touch panel 252 can use at least one of capacitive, resistive, infrared, and ultrasonic methods. Additionally, the touch panel 252 can further include a control circuit. The touch panel 252 can further include a tactile layer to provide a tactile response to a user.

The (digital) pen sensor 254 can include part of a touch panel or a separate sheet for recognition.

The key 256 can include a physical button, a touch key, an optical key, or a keypad.

The ultrasonic input device 258 can detect ultrasonic waves from an input means through a microphone 288 and identify data corresponding to the detected ultrasonic waves.

The display 260 includes at least one of a panel 262, a hologram device 264, a projector 266, and/or a control circuit for controlling them.

The panel 262 can be implemented to be flexible, transparent, or wearable, for example. The panel 262 and the touch panel 252 can be configured with one or more modules. The panel 262 can include a pressure sensor (or a force sensor) for measuring a pressure of the user touch. The pressure sensor can be integrated with the touch panel 252, or include one or more sensors separately from the touch panel 252.

The hologram device 264 can display three-dimensional images in the air by using the interference of light.

The projector 266 can display an image by projecting light on a screen. The screen can be placed inside or outside the electronic device 201.

The interface 270 can include an HDMI 272, a USB 274, an optical interface 276, or a D-subminiature (D-sub) 278. Additionally or alternately, the interface 270 can include a mobile high-definition link (MHL) interface, a SD card/MMC interface, or an infrared data association (IrDA) standard interface.

The audio module 280 can convert sounds into electrical signals and convert electrical signals into sounds. The audio module 280 can process sound information inputted or outputted through a speaker 282, a receiver 284, an earphone 286, or the microphone 288.

The camera module 291, as a device for capturing still images and videos, can include one or more image sensors (e.g., a front sensor or a rear sensor), a lens, an image signal processor (ISP), or a flash (e.g., an LED or a xenon lamp).

The power management module 295 can manage the power of the electronic device 201. The power management module 295 can include a power management IC (PMIC), a charger IC, or a battery gauge. The PMIC can have a wired and/or wireless charging method. The wireless charging method can include a magnetic resonance method, a magnetic induction method, or an electromagnetic method, and can further include an additional circuit for wireless charging, for example, a coil loop, a resonant circuit, or a rectifier circuit. The battery gauge can measure a remaining capacity, a voltage, current, or temperature of the battery 296. The battery 296 can include a rechargeable battery and/or a solar battery.

The indicator 297 can display a specific state of the electronic device 201 or part thereof (e.g., the processor 210), for example, a booting state, a message state, or a charging state.

The motor 298 can convert electrical signals into a mechanical vibration and generate a vibration or haptic effect.

The electronic device 201 can include a mobile TV supporting device (e.g., a GPU) for processing media data according to standards such as digital multimedia broadcasting (DMB), digital video broadcasting (DVB), or Media-FLO™.

Each of the above-described components of the electronic device 201 can be configured with at least one of the above-described components and the name of a corresponding component can vary according to the kind of electronic device.

The electronic device 201 can be configured to include an additional component or to not include some of the above-described components. Additionally, some of components in an electronic device 201 can be configured as a single entity, so that functions of the combined entity are performed identically to the functions of the individual components.

Figure 3:
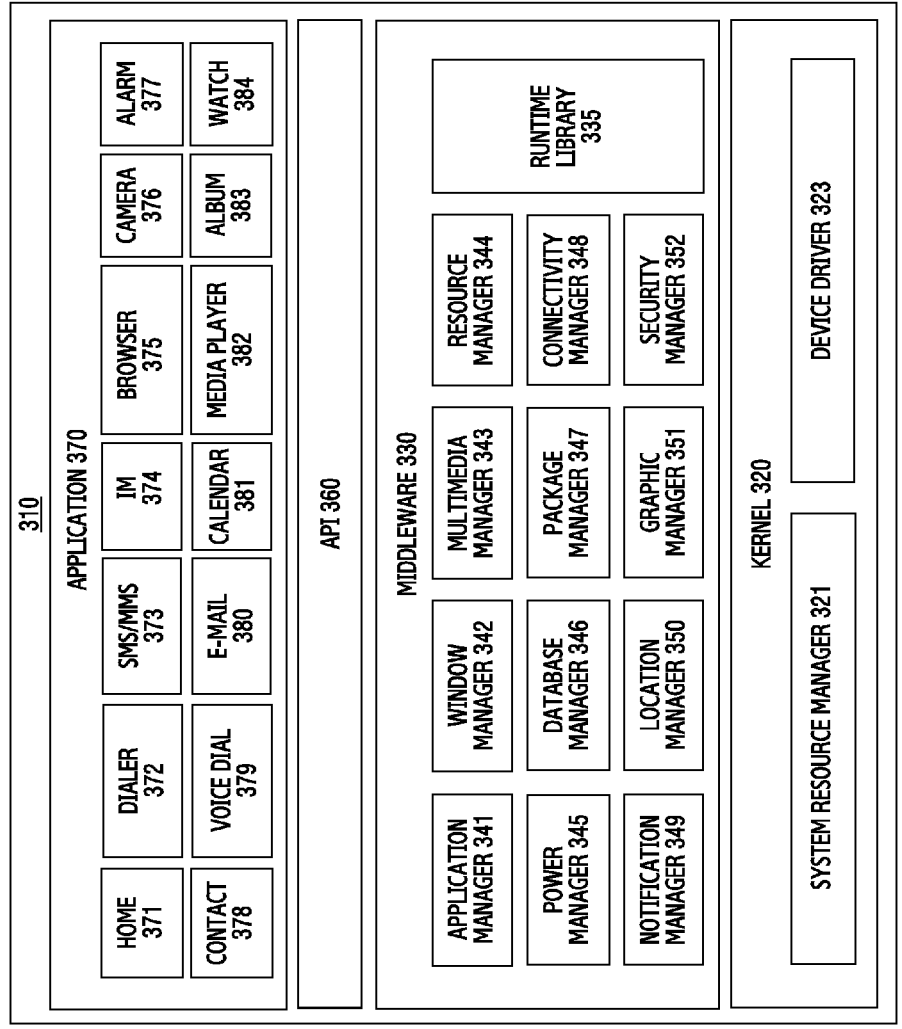
FIG. 3 is a block diagram of a configuration of a program module of an electronic device, according to an embodiment of the present disclosure.

FIG. 3 is a block diagram of a configuration of a program module of an electronic device, according to an embodiment of the present disclosure.

Referring to FIG. 3, a program module 310 of the electronic device 101 is provided. The program module 310 can include an OS for controlling a resource relating to the electronic device 101 and/or the application program 147 running on the OS. The OS can include, for example, Android™, iOS™, Windows™, Symbian™, Tizen™, or Bada™. The program module 310 includes a kernel 320, a middleware 330, an API 360, and/or an application 370. At least part of the program module 310 can be preloaded on the electronic device 101 or can be downloaded from an external electronic device (e.g., the external electronic device 102 or 104, or the server 106).

The kernel 320 includes at least one of a system resource manager 321 and/or a device driver 323. The system resource manager 321 can control, allocate, or retrieve a system resource. The system resource manager 321 can include a process management unit, a memory management unit, or a file system management unit. The device driver 323 can include a display driver, a camera driver, a bluetooth driver, a sharing memory driver, a USB driver, a keypad driver, a Wi-Fi driver, an audio driver, or an inter-process communication (IPC) driver.

The middleware 330 can provide a function commonly required by the application 370, or can provide various functions to the application 370 through the API 360 in order to allow the application 370 to efficiently use a limited system resource inside the electronic device 101. The middleware 330 includes a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include a library module used by a complier to add a new function through a programming language while the application 370 is running. The runtime library 335 can manage input/output, manage memory, or arithmetic function processing.

The application manager 341 can manage the life cycle of the application 370.

The window manager 342 can manage a GUI resource used in a screen.

The multimedia manager 343 can recognize a format for playing various media files and encode or decode a media file by using a codec in a corresponding format.

The resource manager 344 can manage a source code of the application 370 or a memory space.

The power manager 345 can manage the capacity or power of the battery and provide power information for an operation of the electronic device 101. The power manager 345 can operate together with a basic input/output system (BIOS).

The database manager 346 can create, search, or modify a database used in the application 370.

The package manager 347 can manage installation or updating of an application distributed in a package file format.

The connectivity manger 348 can manage a wireless connection.

The notification manager 349 can provide an event, such as incoming messages, appointments, and proximity alerts, to a user of the electronic device 101.

The location manager 350 can manage location information of an electronic device 101.

The graphic manager 351 can manage a graphic effect to be provided to the user or a user interface relating thereto.

The security manager 352 can provide system security or user authentication.

The middleware 330 can include a telephony manager for managing a voice or video call function of the electronic device 101, or a middleware module for combining various functions of the above-described components of the electronic device 101.

The middleware 330 can provide a module specialized for each type of OS. The middleware 330 can dynamically delete part of the existing components or add new components.

The API 360, as a set of API programming functions, can be provided as another configuration according to the OS. For example, Android™ or iSO™ can provide one API set for each platform, and Tizen™ can provide two or more API sets for each platform.

The application 370 includes a home application 371, a dialer application 372, an SMS/multimedia messaging system (MMS) application 373, an instant message (IM) application 374, a browser application 375, a camera application 376, an alarm application 377, a contact application 378, a voice dial application 379, an e-mail application 380, a calendar application 381, a media player application 382, an album application 383, and a clock 384 application. The application 370 may additionally include a health care application (e.g., for measuring an exercise amount or a blood sugar level) or an environmental information application (e.g., for providing air pressure, humidity, or temperature information). The application 370 can include an information exchange application for supporting information exchange between the electronic device 101 and an external electronic device. The information exchange application can include a notification relay application for relaying specific information to the external device or a device management application for managing the external electronic device. For example, the notification relay application can relay notification information from another application 370 of the electronic device 101 to an external electronic device, or receive and forward notification information from an external electronic device to the user. The device management application can install, delete, or update a function (e.g., turn-on/turn off of the external electronic device itself (or some components) or display brightness (or resolution) adjustment) of an external electronic device communicating with the electronic device 101, or an application operating in the external electronic device. The application 370 can include an application (e.g., a health care application of a mobile medical device) according to a property of the external electronic device. The application 370 can include an application received from an external electronic device. At least part of the program module 310 can be implemented (e.g., executed) with software, firmware, hardware, or a combination thereof, and can include a module, a program, a routine, a set of instructions, or a process for executing one or more functions.

A term "module" used in the present disclosure may represent a unit consisting of hardware, software, or firmware, and may be used interchangeably with a terms such as, "unit", "logic", "logical block", "component", "circuit", etc. The "module" may be an integrally constructed component or a minimum unit or one part thereof for performing one or more functions. The "module" may be mechanically or electrically implemented, and may include an application-specific integrated circuit (ASIC) chip, a field-programmable gate arrays (FPGAs), or a programmable-logic device, which is now known or is to be developed, to perform certain operations.

At least one part of an apparatus (e.g., modules or functions thereof) or method (e.g., operations) may be implemented with an instruction stored in a computer-readable storage media. If the instruction is executed by one or more processors, the one or more processors may perform a function corresponding to the instruction. The computer-readable storage media may include a hard disk, a floppy disk, magnetic media (e.g., a magnetic tape), optical media (e.g., a compact disc-ROM (CD-ROM), a DVD, and a magnetic-optic media (e.g., a floptical disk)), an internal memory, etc. The instruction may include a code created by a compiler or a code executable by an interpreter.

The module or programming module may further include at least one or more elements among the aforementioned elements, or may omit some of them, or may further include additional other elements. Operations performed by a module, programming module, or other elements may be executed in a sequential, parallel, repetitive, or heuristic manner. In addition, some of the operations may be executed in a different order or may be omitted, or other operations may be added.

Figure 4:
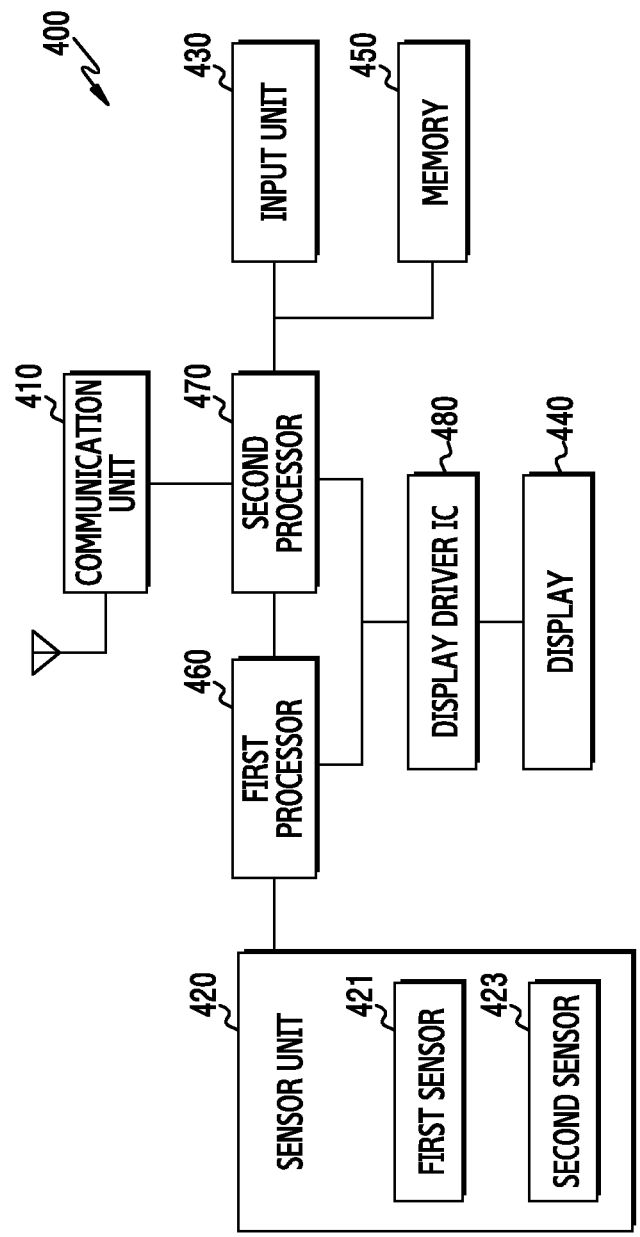
FIG. 4 is a block diagram of components of an electronic device, according to an embodiment of the present disclosure.

FIG. 4 is a block diagram of components of an electronic device, according to an embodiment of the present disclosure.

Referring to FIG. 4, an electronic device 400 is provided. The electronic device 400 includes a communication unit 410, a sensor unit 420, an input unit 430, a display 440, a memory 450, a first processor 460, a second processor 470, and a display driver IC (DDI) 480.

The communication unit 410 can communicate with an external device using various communication schemes. For example, the communication unit 410 can perform wired or wireless communication. The communication unit 410 can include at least one antenna. The communication unit 410 can access at least one of a mobile communication network and a data communication network. Alternatively, the communication unit 410 can perform short-range communication. For example, the external device can include at least one of an electronic device, a base station, a server, and a satellite. The external device can include a wearable device and a home appliance capable of communicating with the electronic device 400, for example, a television, an air conditioner, a refrigerator, and the like. The communication schemes can include bluetooth, BLE, and NFC.

The sensor unit 420 can measure physical quantities near the electronic device 400. Alternatively, the sensor unit 420 can detect a state of the electronic device 400. That is, the sensor unit 420 can detect a physical signal. The sensor unit 420 can convert the physical signal to an electrical signal. For example, the sensor module 240 can include at least one of a gesture sensor, a gyro sensor, an atmospheric pressure sensor, a magnetic sensor, an acceleration sensor, a grip sensor, a proximity sensor, a color sensor (e.g., an RGB sensor), a biometric sensor, a temperature/humidity sensor, an illumination sensor, and an UV sensor. The biometric sensor can include at least one of an E-nose sensor, an electromyography (EMG) sensor, an electroencephalogram (EEG) sensor, an electrocardiogram (ECG) sensor, an IR sensor, an iris sensor, and a fingerprint sensor.

The sensor unit 420 can include a first sensor 421 and a second sensor 423. The first sensor 421, which is a proximity sensor (hereinafter, referred to as the proximity sensor 421) can sense whether a particular object approaches outside the electronic device 400 and provides the sensing data to the first processor 460. The second sensor 423, which is a motion sensor (hereinafter, referred to as the motion sensor 423), can send and provide a movement of the electronic device 400 to the first processor 460. The motion sensor 423 can include an accelerometer sensor, a geomagnetic sensor, etc., and sense movement speed and direction of the electronic device 400. The sensor unit 420 can include a pedometer sensor.

The input unit 430 can generate input data in the electronic device 400. The input unit 430 can include at least one input means. For example, the input unit 430 can include at least one of a keypad, a dome switch, a physical button, a touch panel, and a jog and shuttle.

The display 440 can output display data from the electronic device 400. For example, the display 440 can include an LCD, an LED display, an OLED display, an AMOLED display, an MEMS display, and an electronic paper display. The display 440 can be combined with the input unit 430 as a touch screen. The display 440 can include a single display or a plurality of displays.

The memory 450 can store operating programs of the electronic device 400. The memory 450 can store data generated in program executions. For example, the memory 450 can include an internal memory or an external memory. The internal memory can include at least one of an internal memory and an external memory. The internal memory can include at least one of a volatile memory (e.g., DRAM, SRAM, or SDRAM) and a non-volatile memory (e.g., OTPROM, PROM, EPROM, EEPROM, mask ROM, flash ROM, flash memory, hard drive, or SSD). The external memory can include at least one of a flash drive, a CF, an SD, a micro SD, a mini SD, an XD, an MMC, and a memory stick.

When the second processor 470 displays contents on at least part of the display 440, the first processor 460 can receive sensing information from the sensor unit 420. When the sensing information satisfies a condition of deactivating the display 440 according to the sensing information, the first processor 460 can send first notification information to the second processor 470 notifying not to display the contents on at least part of the display 440. The condition of deactivating the display 440 can be a condition for not displaying the contents on at least part of the display 440.

To re-display the contents on at least part of the deactivated display 440, the first processor 460 can check sensing information received from the sensor unit 420. When the sensing information satisfies a condition of activating at least part of the display 440, the first processor 460 can send second notification information to the second processor 470. The second notification information can be a signal for displaying the contents on at least part of the display 440.

The second processor 470 can control operations in the electronic device 400. The second processor 470 can control the components of the electronic device 400. The second processor 470 can receive and process commands or data from the components of the electronic device 400. The DDI 480 can drive the display 440.

The second processor 470 can provide the DDI 480 with information regarding at least part of contents to display on the display 440. The second processor 470 can provide the information regarding at least part of contents to the DDI 480 and then enter a sleep mode. The second processor 470 in the sleep mode can provide the DDI 480 with at least one control information including the information regarding at least part of the contents. The second processor 470 can switch to a wake-up mode on a periodic basis or based on the notification information received from the first processor 460. The contents to display on the display 440 can include a time, a date, weather, a message, news, etc. The first processor 460 can be a sensor hub, and the second processor 470 can be an application processor.

The first processor 460 can receive sensing information from the proximity sensor 421 every first cycle and obtain state information (e.g., information indicating proximity of a particular object to the electronic device 400) of the electronic device 400. When the particular object is close to the electronic device 400 according to the sensing information, the first processor 460 can change the first cycle to a second cycle. The first processor 460 can receive and obtain sensing information from the proximity sensor 421 every second cycle. According to the sensing information, when the particular object is still close to the electronic device 400, the first processor 460 can provide first notification information to the second processor 470. The second processor 470 may not display contents on the display 440 based on the first notification information. Alternatively, the second processor 470 can change brightness of the display 440.

When the display 440 does not display contents, the first processor 460 can change the second cycle to a third cycle. The first processor 460 can receive and obtain sensing information from the proximity sensor 421 every third cycle. According to the sensing information, when the proximity is released (e.g., when the electronic device 400 is not hidden by the particular object), the first processor 460 can provide second notification information to the second processor 470. The second processor 470 can display contents on the display 440 by returning the display 440 to the original state based on the first notification information.

The first processor 460 can receive and obtain sensing information from the motion sensor 423. When detecting a posture change of the electronic device 400 according to the sensing information, the first processor 460 can check a time when the changed posture of the electronic device 400 is maintained. When the changed posture is maintained during a threshold time, the first processor 460 can receive and obtain sensing information from the proximity sensor 421. When a particular object is close to the electronic device 400 according to the sensing information, the first processor 460 can provide first notification information to the second processor 470. The second processor 470 may not display current contents on the display 440 based on the first notification information. Alternatively, the second processor 470 can change brightness of the display 440. At this time, the first processor 460 can deactivate the proximity sensor 421.

When the display 440 does not display the contents, the first processor 460 can receive and obtain sensing information from the motion sensor 423 in real time. When re-detecting a posture change of the electronic device 400, the first processor 460 can provide second notification information to the second processor 470. Based on the second notification information, the second processor 470 can return the display 440 to the original state and thus display contents on the display 440. The first processor 460 can activate the proximity sensor 421.

The first processor 460 can receive and obtain sensing information from the motion sensor 423. When detecting a motion of the electronic device 400 according to the sensing information, the first processor 460 continuously check the motion of the electronic device 400. The first processor 460 can obtain a behavioral state of the electronic device 400 or the user using at least one of a speed and a direction of the motion of the electronic device 400, and the number of steps of the user holding the electronic device 400. According to the user's behavioral state, when the user is running or moving using a transportation means, such as a bicycle or a vehicle, the first processor 460 can determine that the user cannot check the display 440. When the user cannot check the display 440, the first processor 460 can provide first notification information to the second processor 470. Based on the first notification information, the second processor 470 may not display current contents on the display 440. Alternatively, the second processor 470 can change brightness of the display 440. In this case, the first processor 460 can deactivate the proximity sensor 421.

When the display 440 does not display the current contents, the first processor 460 can receive and obtain sensing information from the motion sensor 423 in real time. When detecting no movement of the electronic device 400 or detecting the user's walking, the first processor 460 can provide second notification information to the second processor 470. Based on the second notification information, the second processor 470 can return the display 440 to the original state and thus display contents on the display 440. The first processor 460 can activate the proximity sensor 421.

The second processor 470 can check a connection state with a wearable device through the communication unit 410. The wearable device can include a smart watch, smart glasses, etc. The second processor 470 can receive a sensing result from the wearable device and thus control the display 440. The sensing result can include a state of a user's who is putting on the wearable device a sleeping state, a walking state, a running state, or a moving state, using a transportation means such as a bicycle or a vehicle. According to the sensing result received from the wearable device, the second processor 470 may not display the current contents on the display 440. When the user is sleeping, running, or moving, the second processor 470 may not display the current contents on the display 440. When a connection signal level (i.e., received signal strength indicator (RSSI)) of the wearable device falls below a threshold or the wearable device is disconnected, the second processor 470 may not display the current contents on the display 440. After not displaying the current contents on the display 440, upon receiving a sensing result about a user's state change, from the wearable device, the second processor 470 can return the display 440 to the original state and thus display contents on the display 440. The sensing result about the user's state change can indicate that the user who was sleeping activates the electronic device 400 or the user who was running starts walking or stops moving.

The second processor 470 can communicate with a home appliance allowing communication, for example, a television, an air conditioner, and a refrigerator, through the communication unit 410. The second processor 470 can receive a sensing result from the home appliance and thus control the display 440. The sensing result can be related to the user's state near the home appliance, for example, a sleeping state or a television viewing state.

According to the sensing result received from the home appliance, the second processor 470 may not display the current contents on the display 440. For example, when the home appliance, such as a television, includes a camera and a user movement is not detected during a certain time, the second processor 470 can send the sensing information to the electronic device 400. When detecting no user movement during a certain time, the second processor 470 can determine the user's sleeping state using the received sensing information and may not display the current contents on the display 440. For example, when the television outputs broadcasting data of the same channel during a certain time, it can send sensing information to the electronic device 400. The second processor 470 can determine that the user is viewing the television using the received sensing information and may not display the current contents on the display 440. After not displaying the contents on the display 440, when receiving a sensing result about a user's state change from the home appliance, the second processor 470 can return the display 440 to the original state and thus display the contents on the display 440. The sensing result about the user's state change can indicate that a movement of the user who was sleeping is detected, the television is turned off, or the channel is changed.

The electronic device 400 includes the sensor unit 420 including at least one sensor, the first processor 460 for controlling the display 440 and the sensor unit 420, and the second processor 470 for controlling the display 440. When the display 440 displays contents, the first processor 460 obtains the state information of the electronic device 400 on the first cycle using the first sensor 421 of the sensor unit 420, determines whether the state information is maintained on the second cycle using the first sensor 421, and when determining that the state information is maintained based on the second cycle, provides the first notification information corresponding to the determination to the second processor 470. The second processor 470 can control to change the state of the display 440 which displays contents in response to the first notification information.

The electronic device 400 further includes the DDI 480. The second processor 470 can provide the DDI 480 with information about at least part of the contents to display on the display 440 and then enter the sleep mode.

The second processor 470, in the sleep mode, can enter the wake-up mode on a period basis or based on the notification information so as to provide the DDI 480 with at least one control information including the information about at least part of the contents.

Based on the first notification information received from the first processor 460, the second processor 470 can change the brightness of the display 440 and can determine whether to display the contents on the display 440.

After the state of the display 440 is changed, the first processor 460 determines the change of the state information on the third cycle using the first sensor 421. When the state information is changed, the first processor 460 can provide second notification information corresponding to the determination to the second processor 470.

The second processor 470 can change the changed state of the display 440 to the original state based on the second notification information.

The first sensor 421 can include the proximity sensor, the first cycle can exceed the second cycle, and the second cycle can exceed the third cycle.

The first processor 460 can detect a posture change of the electronic device 400 using a second sensor 423 of the sensor unit 420, when the changed posture is maintained for a preset time, determine the state information using the first sensor 421, and provide the first notification information to the second processor in response to the determination, and the second processor 470 can change the state of the display 440 which displays the contents in response to the first notification information.

The second sensor 423 can include an accelerometer sensor. When the state of the display 440 is changed, the first processor 460 can deactivate the first sensor 421, detect a posture change of the electronic device 400 using the second sensor 423, and when detecting the posture change of the electronic device 400, switch the changed state of the display 440 to an original state using the second processor 470.

The first processor 460 can obtain activity information or pedometer information of a user using sensing information acquired by the second sensor 423 of the sensor unit 420, and when at least part of the obtained information exceeds a preset threshold, change the state of the display 440.

The electronic device 400 can further include a communication unit 410. The second processor 470 receives at least one state information from at least one other electronic device connected with the communication unit 410 through the communication unit 410, and changes the state of the display 440 which displays the contents based on the at least one state information.

Figure 5C:
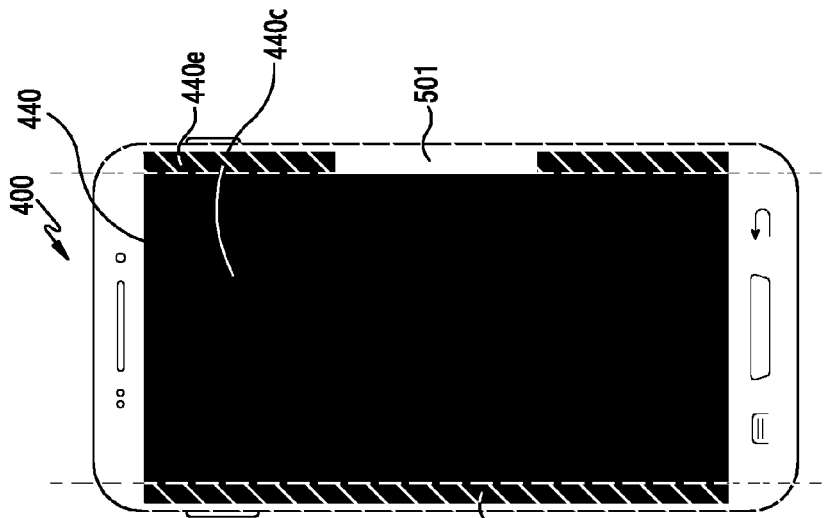
FIGS. 5A to 5C illustrate various displays of an electronic device, according to an embodiment of the present disclosure.
Figure 5B:
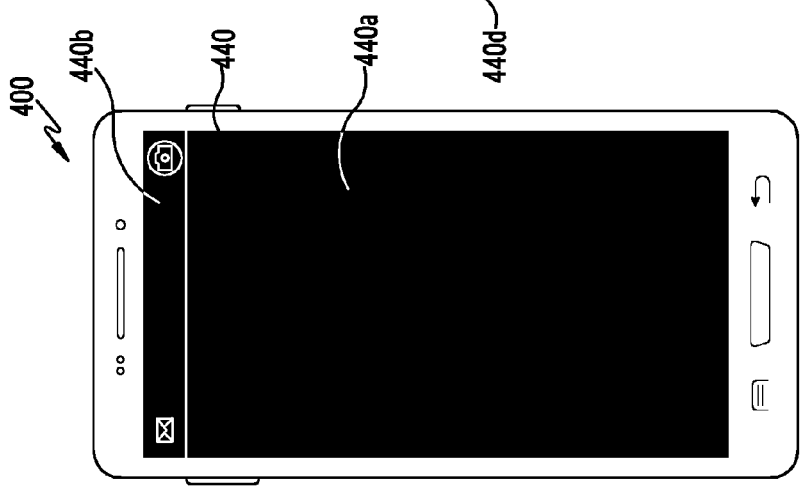
Figure 5A:
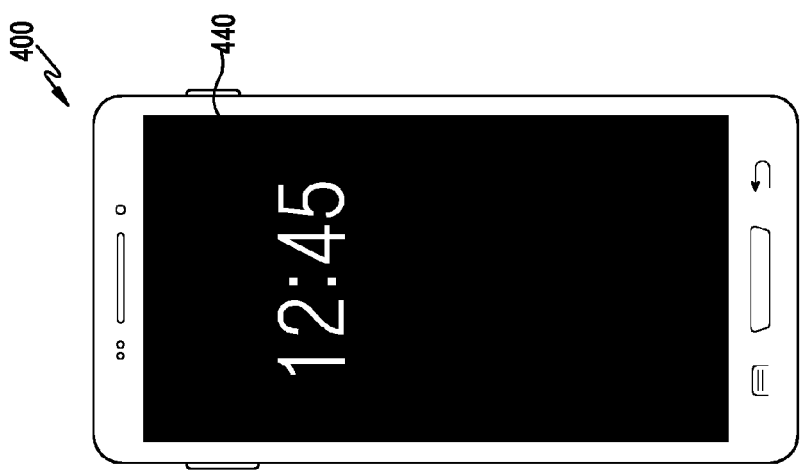

FIGS. 5A to 5C illustrate various displays of an electronic device according to an embodiment of the present disclosure.

Referring to FIGS. 5A to 5C, various displays of the electronic device 400 are shown. The second processor 470 of the electronic device 400 can provide the DDI 480 with information about at least part of the contents to display on the display 440. Next, the second processor 470 can enter the sleep mode. The electronic device 400 can display a current time on part of the display 440, as shown in FIG. 5A. When the display 440 includes a first display 440*a* and a second display 440*b*, the electronic device 400 can display contents only on the second display 440*b*, as shown in FIG. 5B. When the display 440 includes a first display 440*c*, a second display 440*d*, and a third display 440*e*, the electronic device 400 can display a particular color on the second display 440*d* and the third display 440*e*, as shown in FIG. 5C.

The second processor 470 can switch from the sleep mode to the wake-up mode on a periodic basis or based on notification information received from the first processor 460. When a message is received, the second processor 470 can enter the wake-up mode and change a color of part of the second display 440*d* or the third display 440*e*. As such, the second processor 470 even in the sleep mode displays information regarding at least part of contents on the display 440 by means of the DDI 480. Hence, even when the electronic device 400 is locked, the display 440 can display various information such as time, date, weather, message, and news, with low power.

Figure 6:
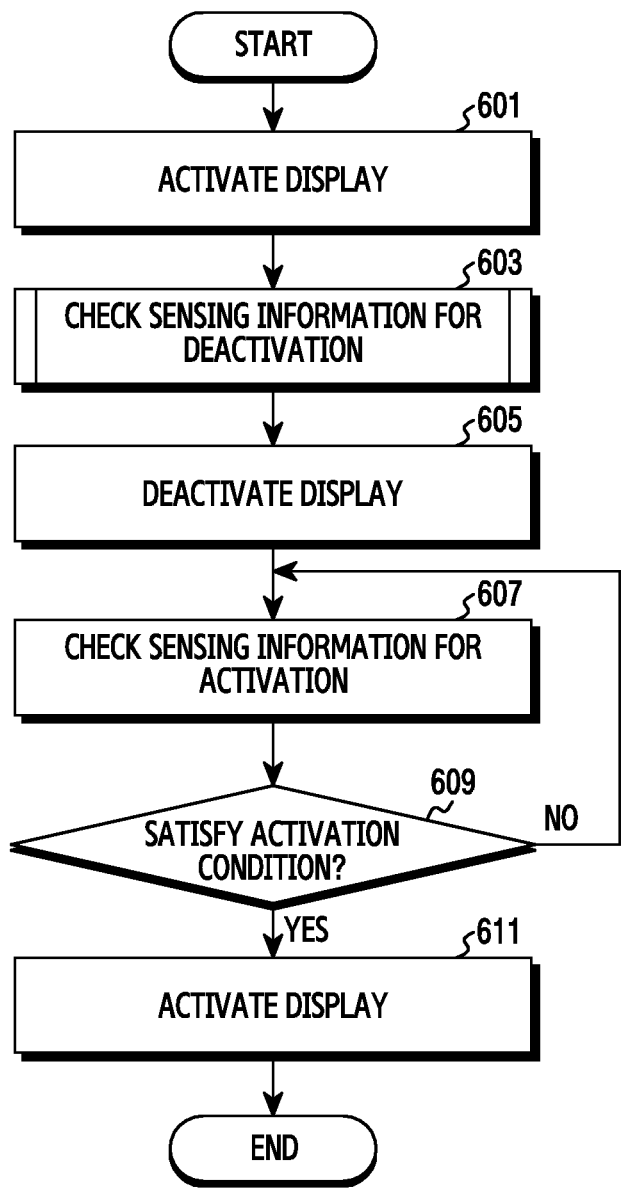
FIG. 6 is a flowchart of an operating method of an electronic device, according to an embodiment of the present disclosure.

FIG. 6 is a flowchart of an operating method of an electronic device, according to an embodiment of the present disclosure.

Referring to FIG. 6, a method of operating the display 440 of the electronic device 400 is provided.

At step 601, the display 440 of the electronic device 400 is activated.

When the electronic device 400 is locked, the second processor 470 can enter the sleep mode in step 601. The second processor 470 can provide the DDI 480 with information about at least part of contents to display on the display 440. The DDI 480 can display contents including various information such as time, date, weather, message, and news, on the display 440 with low power. The second processor 470 of the electronic device 400 can generate data including at least part of contents to display on the display 440. The second processor 470 can send the generated data to the DDI 480 and enter the sleep mode. In so doing, the electronic device 400 can implement a low-power always on display (AOD) and a self-display without intervention of the second processor 470.

At step 603, the first processor 460 can obtain sensing information for deactivating the display 440. The deactivation of the display 440 can display no contents on the display 440 or change the brightness of the display 440. In step 603, the first processor 460 can obtain the sensing information received from at least one of the first sensor 421 (hereafter, referred to as the proximity sensor 421) and the second sensor 423 (hereafter, referred to as the motion sensor 423). The motion sensor 423 can include an accelerometer sensor and/or a gyro sensor.

When a particular object is close to the electronic device 400 (e.g., the electronic device 400 is put in a bag or a pocket or hidden by the particular object) during the threshold time according to a sensing result of the proximity sensor 421 at step 603, the first processor 460 can provide first notification information to the second processor 470. At step 603, the first processor 460 can detect a posture change of the electronic device 400 (e.g., the electronic device 400 is turned over) through the motion sensor 423 and confirm that the changed posture is maintained during the threshold time. Upon confirming that the changed posture is maintained during the threshold time and the particular object is close the electronic device 400 through the proximity sensor 421, the first processor 460 can provide the first notification information to the second processor 470.

The first processor 460 can detect the state of the electronic device 400 based on the information obtained from the motion sensor 423 at step 603. Based on the sensing information from the motion sensor 423, the first processor 460 can determine at least one of a speed and a direction of the movement of the electronic device 400, the number of steps of the user holding the electronic device 400, and an activity state. Thus, the first processor 460 can determine the user's behavioral state. When the user is running or moving using a transportation means, such as a bicycle or a vehicle, the first processor 460 can provide first notification information to the second processor 470. Obtaining the sensing information in the first processor 460 is described in more detail with respect to FIG. 7 through FIG. 14.

At step 605, the second processor 470 can deactivate the display 440. The second processor 470 can enter the wake-up mode based on the first notification information received from the first processor 460. The second processor 470 in the wake-up mode may not display current contents on the display 440. The second processor 470 can enter the sleep mode again.

At step 607, the first processor 460 can check sensing information to re-activate at least part of the deactivated display 440. When the sensing information satisfies an activation condition at step 609, the first processor 460 proceeds to step 611.

The first processor 460 can check a sensing result of the proximity sensor 421 at step 607.

At step 609, the first processor 460 determines whether the activation condition of the display 440 is satisfied. When the proximity is released (e.g., when the electronic device 400 is not hidden by the particular object) according to the sensing, the first processor 460 determines that the activation condition of the display 440 is satisfied. The first processor 460 can provide second notification information to the second processor 470.

The first processor 460 can check a sensing result of the motion sensor 423 at step 607. When detecting the posture change of the electronic device 400 according to the sensing result, the first processor 460 can determine that the activation condition of the display 440 is satisfied in step 609. The first processor 460 can provide the second notification information to the second processor 470.

The first processor 460 can check a sensing result of the motion sensor 423 at step 607. When the movement of the electronic device 400 stops or falls below a threshold according to the sensing result, the first processor 460 can determine that the activation condition of the display 440 is satisfied at step 609. The first processor 460 can provide the second notification information to the second processor 470.

When the sensing information does not satisfy the activation condition in step 609, the first processor 460 returns to step 607.

When the sensing information does satisfy the activation condition, then at step 611, the second processor 470 can re-activate the display 440. The second processor 470 can enter the wake-up mode based on the second notification information received from the first processor 460. The second processor 470 in the wake-up mode can display contents by activating the display 440. Next, the second processor 470 can return to the sleep mode.

Figure 7:
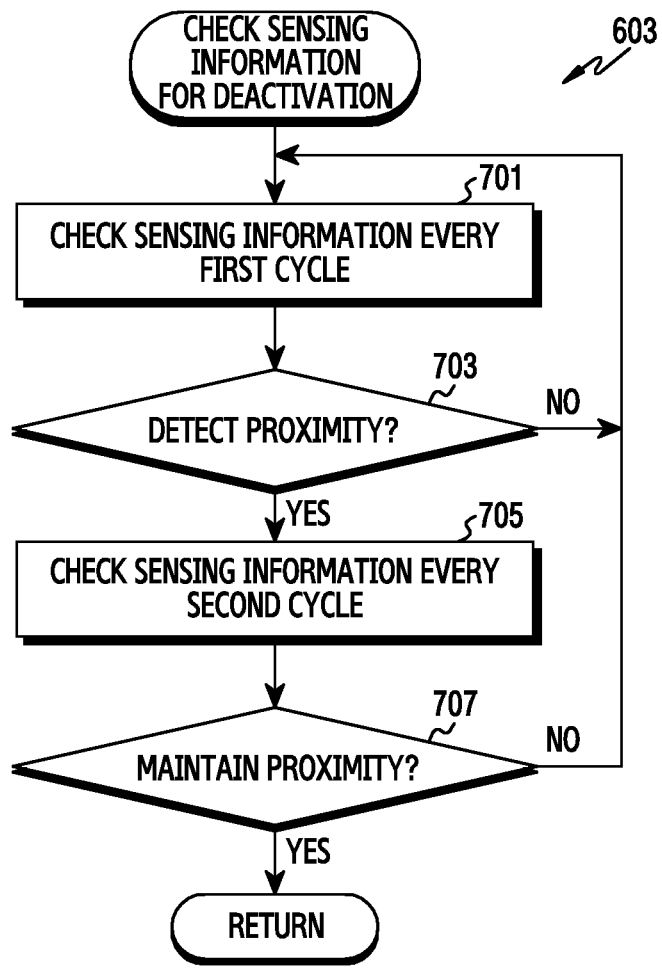
FIG. 7 is a flowchart of a method of checking sensing information in an electronic device, according to an embodiment of the present disclosure.

FIG. 7 is a flowchart of a method of checking sensing information in an electronic device, according to an embodiment of the present disclosure.

Referring to FIG. 7, a method of step 603 of FIG. 6 is described in further detail. In this method of step 603, the sensing information is received from the proximity sensor 421.

At step 701, the first processor 460 can check sensing information every first cycle. For example, the first processor 460 can receive and check the sensing information from the proximity sensor 421 for three seconds every minute.

At step 703, the first processor determines whether a particular object approaches the proximity sensor 421 according to the sensing information. When the particular object approaches the proximity sensor 421, the first processor 460 proceeds to step 705. When the particular object does not approach the proximity sensor 421, the first processor 460 returns to step 701.

At step 705, the first processor 460 can check sensing information every second cycle. For example, the first processor 460 can change the sensing cycle of the proximity sensor 421 and check the sensing information for three seconds every 20 seconds.

At step 707, the first processor 460 determines whether the proximity of the particular object is maintained according to the sensing information. When the proximity of the particular object is maintained, the first processor 460 returns to step 605 of FIG. 6. When the proximity of the particular object is not maintained, the first processor 460 returns to operation 701. Alternatively, when checking the sensing information, for example, for 20 seconds every three seconds and detecting the proximity to the proximity sensor 421 maintained more than three times, the first processor 460 can return to step 605 of FIG. 6. In step 607 of FIG. 6, the first processor 460 can check the sensing information every third cycle by changing the sensing cycle of the proximity sensor 421. The first processor 460 can change the sensing cycle of the proximity sensor 421 and thus check the sensing information for 0.2 seconds every second, for example. When determining the proximity release (e.g., when the electronic device 400 is not hidden by the particular object) according to the sensing information in operation 609, the first processor 460 can provide the second notification information to the second processor 470. The first cycle, the second cycle, and the third cycle can change, and the measurement time for collecting the sensor information in every cycle can also change.

FIGS. 8A to 8D illustrate various displays of an electronic device, according to an embodiment of the present disclosure.

Referring to FIGS. 7 and 8A to 8D, various displays of the electronic device 400 are shown to explain the operations of FIG. 7.

Referring to FIG. 8A and step 701 of FIG. 7, when the electronic device 400 is locked, the second processor 470 can enter the sleep mode. The second processor 470 can provide the DDI 480 with information about at least part of contents to display on the display 440. The DDI 480 can display contents on the display 440. While the display 440 displays the contents, the first processor 460 can perform step 701. At step 701, the first processor 460 can receive sensing information from the proximity information 421. The proximity sensor 421 can check the sensing information every first cycle. The proximity sensor 421 can check the sensing information on the first cycle for three seconds B1 on a one-minute cycle A1 under the control of the first processor 460.

Referring to FIG. 8B and step 703 of FIG. 7, the first processor 460 can determine whether a particular object 801 approaches the proximity sensor 421 every three seconds B1 on the one-minute cycle A1, for example. Upon detecting the proximity of the particular object 801, the first processor 460 proceeds to step 705.

Referring to FIG. 8C and steps 705 and 707 of FIG. 7, when the particular object 801 is close to the proximity sensor 421, the first processor 460 can change the sensing cycle of the proximity sensor 421 from the first cycle to the second cycle. At step 705, the first processor 460 can receive the sensing information checked every second cycle, for example, from the proximity sensor 421. Alternatively, the proximity sensor 421 can check the sensing information on the second cycle, for example, for three seconds B1 on a 20-second cycle A2 under the control of the first processor 460. At step 707, when detecting the proximity of the particular object 801 to the proximity sensor 421 three times every three seconds B1 on the 20-second cycle A2, for example, as shown in FIG. 8C (e.g., when determining the proximity of the particular object 801 maintained during one minute), the first processor 460 can confirm that the proximity of the particular object 801 to the proximity sensor 421 is maintained.

Referring to FIG. 8D, steps 605-609 of FIG. 6, and step 707 of FIG. 7, upon determining the proximity of the particular object 801 to the proximity sensor 421 is maintained at step 707, the first processor 460 can return to step 605 of FIG. 6. At step 605, the first processor 460 can provide a first notification signal to the second processor 470 not to display the current contents on the display 440, as shown in FIG. 8D. At step 607 of FIG. 6, the first processor 460 can enter the wake-up mode according to the first notification signal and thus may not display the contents on the display 440. When the display 440 does not display the contents, the first processor 460 can check the sensing information on the third cycle, for example, for 0.2 seconds B2 every one second A3, as shown in FIG. 8D. When determining proximity release (e.g., when the electronic device 400 is not hidden by the particular object 801) at step 609, the first processor 460 can provide a second notification signal to the second processor 470. The second processor 470 can enter the sleep mode according to the second notification signal and provide the DDI 480 with information about at least part of contents to display on the display 440. As such, when the proximity sensor 421 detects the particular object close to the electronic device 400, for example, when the electronic device 400 is hidden by an object or when the electronic device 400 is put in a pocket, the electronic device 400 can deactivate the display 440.

Figure 9:
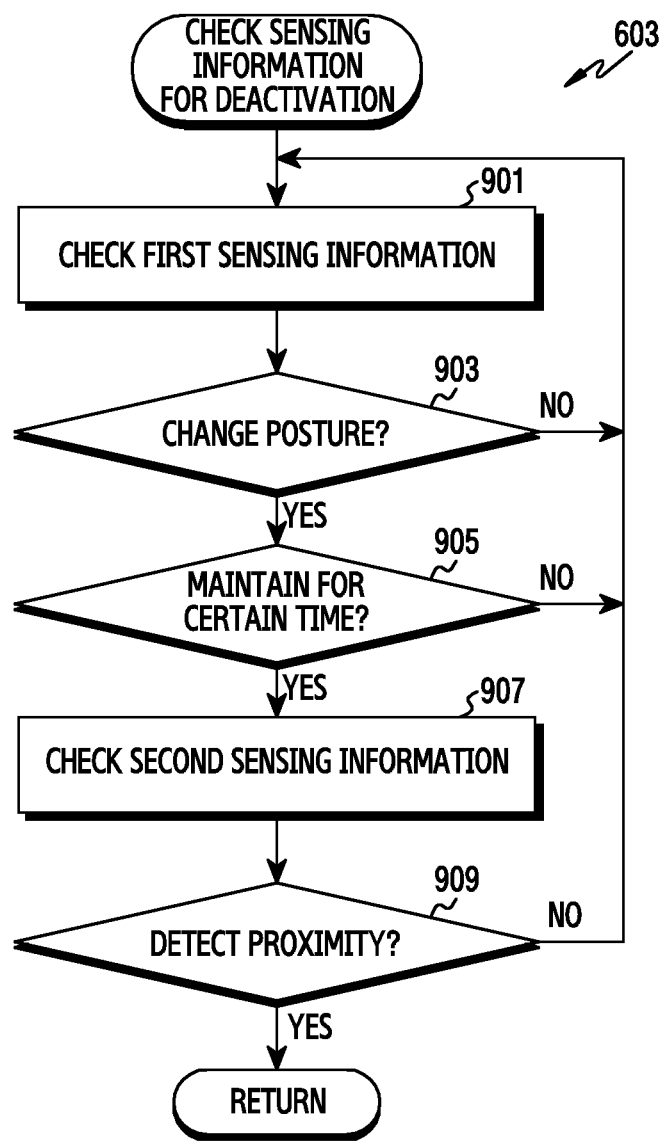
FIG. 9 is a flowchart of a method of checking sensing information in an electronic device, according to an embodiment of the present disclosure.

FIG. 9 is a flowchart of a method of checking sensing information in an electronic device, according to an embodiment of the present disclosure.

Referring to FIG. 9, a method of step 603 of FIG. 6 is described in further detail. In this method of step 603, the sensing information is received from the proximity sensor 421 and the motion sensor 423.

At step 901, the first processor 460 can check first sensing information. The first processor 460 can receive and check first sensing information (e.g., sensor data acquired by the accelerometer sensor) from the motion sensor 423 (e.g., the accelerometer sensor) in real time.

At step 903, the first processor 460 determines whether a posture change of the electronic device 400 is detected. When the posture change of the electronic device 400 is detected, the first processor 460 performs operation 905. When detecting no posture change of the electronic device 400 is detected, the first processor 460 returns to 901. The posture change of the electronic device 400 can indicate that the display 440 is turned over to face the ground. The first processor 460 can monitor the sensor data acquired by the motion sensor 423 (e.g., monitor a Z-axis data value of the accelerometer sensor) and determine the posture change of the electronic device 400 based on the sensor data.

When the changed posture of the electronic device 400 is detected, then at step 905, the first processor 460 determines whether the posture is maintained for a certain time according to the first sensing information. When the posture of the electronic device 400 is maintained for a certain time, the first processor 460 performs step 907. When the posture of the electronic device 400 is changed again within a certain time after the posture change according to the first sensing information in step 905, the first processor 460 returns to operation 901.

When the posture of the electronic device is maintained for the certain time, then at step 907, the first processor 460 can check second sensing information. The first processor 460 can check the second sensing information from the proximity sensor 421. The first processor 460 can determine whether a particular object approaches, based on sensor data measured by the proximity sensor 421.

At step 909, the first processor 460 determines whether a particular object approaches the proximity sensor 421 according to the second sensing information. When the particular object approaches the proximity sensor 421, the first processor 460 returns to step 605 of FIG. 6. When not detecting the particular object approaching the proximity sensor 421, the first processor 460 returns to step 901.

At step 605 of FIG. 6, the first processor 460 can provide the second processor 470 with a first notification signal not to display current contents on the display 440 and deactivate the proximity sensor 421. The first processor 460 can receive and obtain the first sensing information in step 607 of FIG. 6. When detecting a posture change of the electronic device 400 based on the first sensing information in step 609, the first processor 460 can provide the second notification information to the second processor 470. The first processor 460 can monitor the sensor data acquired by the motion sensor 423 and determine the posture change of the electronic device 400 based on the sensor data.

Figure 10:
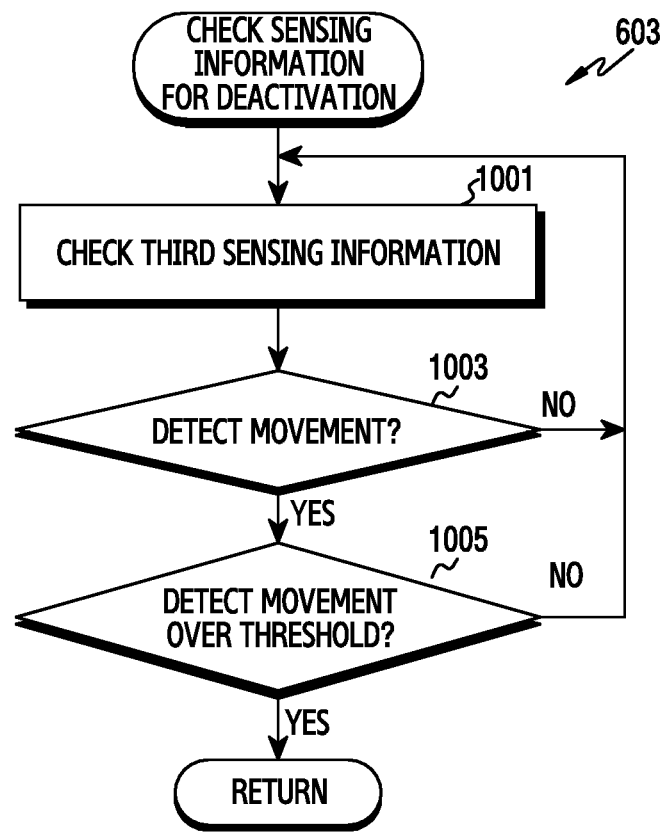
FIG. 10 is a flowchart of a method of checking sensing information in an electronic device, according to an embodiment of the present disclosure.

FIG. 10 is a flowchart of a method of checking sensing information in an electronic device, according to an embodiment of the present disclosure.

Referring to FIG. 10, a method of step 603 of FIG. 6 is described in further detail. In this method of step 693, the sensing information is received from the motion sensor 423.

At step 1001, the first processor 460 can check third sensing information. The first processor 460 can receive and check third first sensing information from the motion sensor 423. The first processor 460 can receive information acquired by the motion sensor 423, including at least one of an accelerometer sensor and a gyro sensor. Using the received information, the first processor 460 can recognize a user's activity with the electronic device 400 and determine the number of steps (e.g., pedometer information). The electronic device 400 can detect a movement based on at least one of the activity recognition and/or the step count determination.

At step 1003, the first processor 460 determines whether movement of the electronic device 400 is detected based on the third sensing information. When the movement of the electronic device 400 is detected, the first processor 460 performs step 1005. When no movement of the electronic device 400 is detected, the first processor 460 returns to step 1001.

When the movement of the electronic device 400 is detected, then at step 1005, the first processor 460 can determine whether the electronic device 400 moves beyond a threshold based on the third sensing information. When the electronic device 400 moves beyond the threshold, the first processor 460 returns to step 605 of FIG. 6. The first processor 460 can determine the behavior of the user holding the electronic device 400 using at least one of a movement speed of the electronic device 400, a movement direction of the electronic device 400, and the number of user's steps based on the third sensing information. The user's behavior can include walking, running, or moving using a transportation means such as a bicycle or a vehicle. Further, the first processor 460 can obtain the user's step count using a pedometer sensor.

When the electronic device 400 does not move beyond the threshold, the first processor 460 returns to step 1001. At step 605 of FIG. 6, the first processor 460 can provide the second processor 470 with a second notification signal not to display current contents on the display 440 and deactivate the proximity sensor 421. The first processor 460 can receive and obtain the sensing information from the motion sensor 423 in step 607 of FIG. 6. When the user who was running or moving using the transportation means starts to walk or halts in step 609, the first processor 460 can provide the second notification information to the second processor 470.

Figure 11:
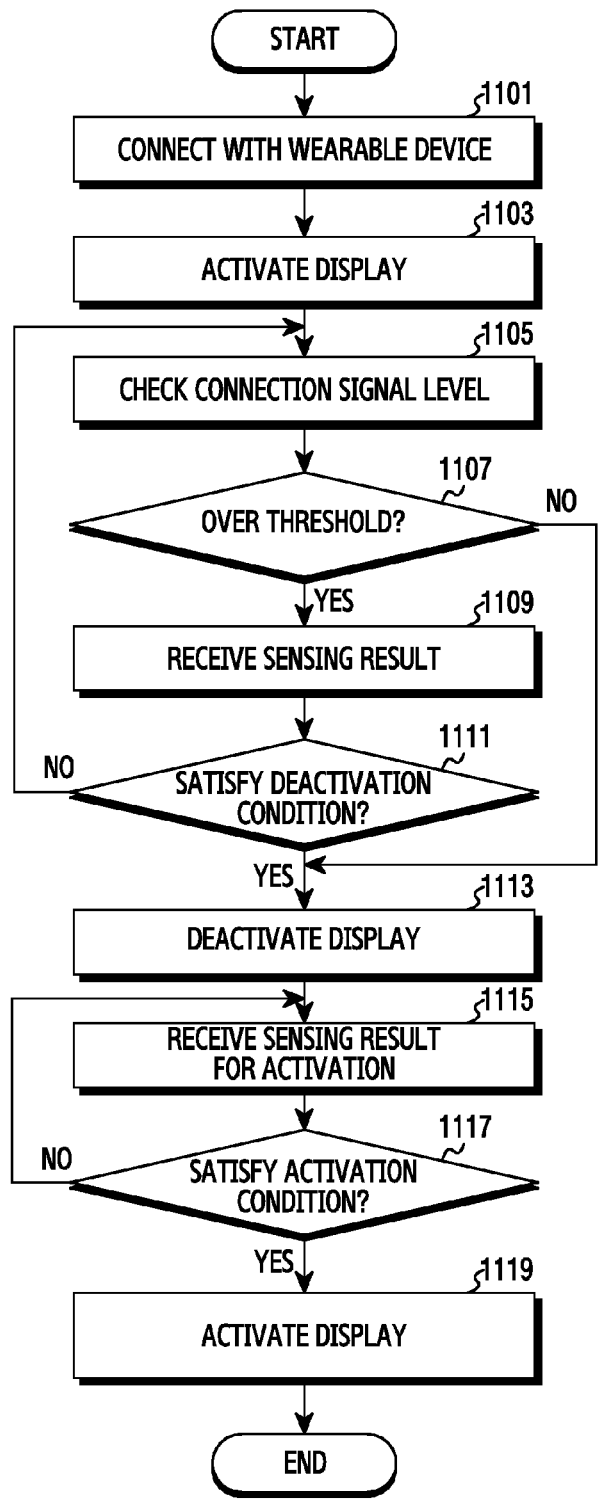
FIG. 11 is a flowchart of an operating method of an electronic device, according to an embodiment of the present disclosure.

FIG. 11 is a flowchart of an operating method of an electronic device, according to an embodiment of the present disclosure.

Referring to FIG. 11, a method of operating the display 440 of the electronic device 400 is provided. The electronic device may be a wearable device.

At step 1101, the second processor 470 can be connected with the wearable device. The wearable device can include a smart watch, smart glasses, and etc.

At step 1103, the display 440 of the wearable device is activated. When the wearable device is connected, the second processor 470 can enter the sleep mode. The second processor 470 can provide the DDI 480 with information about at least part of contents to display on the display 440. The DDI 480 can display contents including various information, such as time, date, weather, message, and news, on the display 440 with low power. The second processor 470 of the electronic device 400 can generate data including at least part of the contents to display on the display 440. The second processor 470 can send the generated data to the DDI 480 and enter the sleep mode. In so doing, the electronic device 400 can realize an AOD and a self-display without intervention of the second processor 470.

At step 1105, the second processor 470 can periodically enter the wake-up mode and thus check a connection signal level (i.e., RSSI) of the wearable device.

At step 1107, the second processor 470 determines if the connection signal of the wearable device exceeds a threshold. When the connection signal level of the wearable device exceeds the threshold, the second processor 470 performs step 1109. When the connection signal level of the wearable device falls below the threshold, the second processor 470 performs step 1113.

When the connection signal level exceeds the threshold, then at step 1109, the second processor 470 can receive the sensing result from the wearable device by periodically entering the wake-up mode, and then perform step 1111. The sensing result received from the wearable device can be derived from sensing information acquired by the motion sensor an accelerometer sensor or a pedometer sensor of the wearable device.

At step 1111, the second processor 470 determines whether the sensing result received from the wearable device satisfies a deactivation condition of the display 440. The sensing result received at the second processor 470 from the wearable device can include activity or pedometer information of the user who is putting on the wearable device. When the user having the wearable device on is sleeping, running, or moving using a transportation means, the second processor 470 can determine that the deactivation condition of the display 440 is satisfied.

When the connection signal does not exceed the threshold or when the deactivation condition is satisfied, then at step 1113, the second processor 470 can deactivate the display 440 and then perform step 1115.

In step 1115, the second processor 470 can periodically enter the wake-up mode and receive a sensing result for activating the display 440. The sensing result can be the connection signal level of the wearable device. The sensing result for activating the display 440 can be a sensing result about the state change of the user who is wearing the wearable device.

At step 1117, the second processor determines whether the sensing result from the wearable device satisfies condition for re-activating at least part of the display 440. The second processor 470 can determine whether the sensing result about a state where the sleeping user with the wearable device put on wakes up, a state where the running user starts to walk or stops running, or a state where the moving user stops moving satisfies the activation condition of the display 440.

When the sensing result received from the wearable device satisfies the activation condition (e.g., when the connection signal level exceeds the threshold), the second processor 470 performs step 1119. When the connection signal level of the wearable device does not satisfy the activation condition, the second processor 470 returns to step 1115.

When the connection signal level satisfies an activation condition, then at step 1119, the second processor 470 can re-activate the display 440 and display contents.

Figure 12:
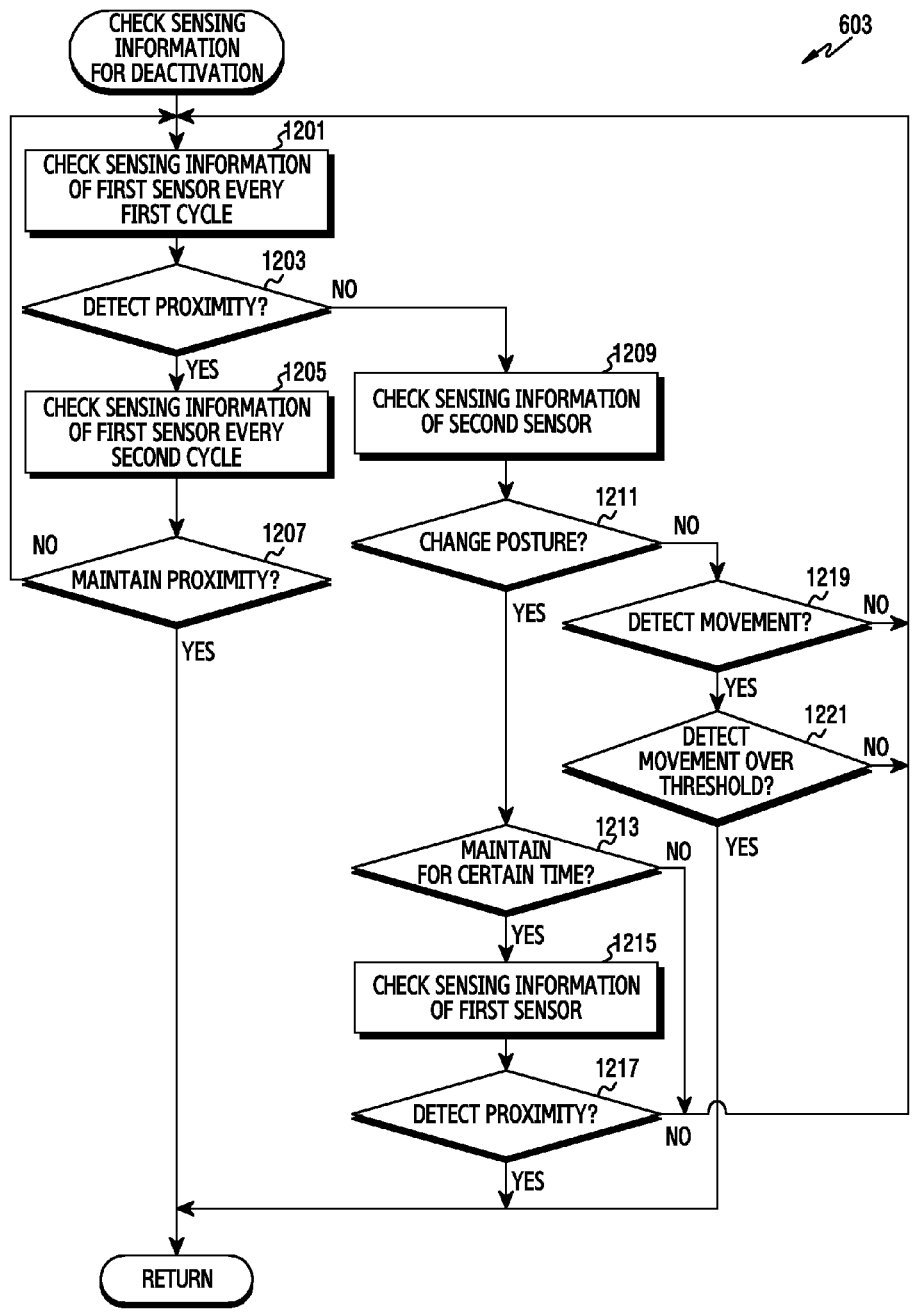
FIG. 12 is a flowchart of a method of checking sensing information in an electronic device, according to an embodiment of the present disclosure.

FIG. 12 is a flowchart of a method of checking sensing information in an electronic device, according to an embodiment of the present disclosure.

Referring to FIG. 12, a method of step 603 of FIG. 6 is described in further detail. In this method of step 603, the sensing information is received from the proximity sensor 421 and the motion sensor 423.

At step 1201, the first processor 460 can check state information of the electronic device 400. The state information can indicate proximity of a particular object to the electronic device 400 (e.g., the electronic device 400 is put in a bag or a pocket or hidden by a particular object). The first processor 460 can check sensing information of the proximity sensor 421 every first cycle. The first processor 460 can receive and check the sensing information from the proximity sensor 421 for three seconds every one minute, for example.

At step 1203, the first processor 460 determines whether a particular object approaches the proximity sensor 421 according to the sensing information. When the proximity of the particular object is detected, the first processor 460 performs step 1205. When the proximity of the particular object is not detected, the first processor 460 performs step 1209.

At step 1205, the first processor 460 can check sensing information every second cycle. The first processor 460 can change a sensing cycle of the proximity sensor 421 and thus check the sensing information for three seconds every 20 seconds, for example.

At step 1207, the first processor 460 determines whether the proximity of the particular object is maintained according to the sensing information. When the proximity of the particular object is maintained, the first processor 460 returns to step 605 of FIG. 6. For example, when checking the sensing information for three seconds every 20 seconds and detecting the proximity to the proximity sensor 421 maintained over three times, the first processor 460 returns to step 605 of FIG. 6. When the proximity of the particular object is not maintained, the first processor 460 returns to step 1201.

At step 1209, the first processor 460 can check sensing information of the motion sensor 423 (e.g., an accelerometer sensor or a gyro sensor) in real time. The first processor 460 can obtain a posture change of the electronic device 400 or a speed, a direction, and the number of user's steps in the movement of the electronic device 400 from the sensing information (e.g., sensor data acquired by the accelerometer sensor or the gyro sensor) received from the motion sensor 423. The motion sensor 423 can include a pedometer sensor.

At step 1211, the first process 460 determines whether a posture change of the electronic device 400 is detected according to the sensing information received from the motion sensor 423. The posture change of the electronic device 400 can indicate that the display 440 is turned over. The first processor 460 can monitor the sensor data acquired by the accelerometer sensor (e.g., monitor a Z-axis data value of the accelerometer sensor) and determine the posture change of the electronic device 400 based on the sensor data. When the posture change is detected, the first processor 460 performs step 1213. When detecting no posture change of the electronic device 400, the first processor 460 performs step 1219.

At step 1213, the first processor 460 determines whether the changed posture of the electronic device 400 is maintained for a certain time. When the posture is maintained for a certain time, the first processor 460 performs step 1215. When the posture of the electronic device 400 is changed again within a certain time in step 1213, the first processor 460 returns to step 1201.

At step 1215, the first processor 460 can check the sensing information from the proximity sensor 421.

At step 1217, the first processor 460 can determine whether a particular object approaches based on the sensor data measured by the proximity sensor 421.

When the particular object approaches the electronic device 400 according to the sensing information received from the proximity sensor 421, the first processor 460 returns to step 605 of FIG. 6. When the particular object does not approach the proximity sensor 421 according to the sensing information received from the proximity sensor 421, the first processor 460 returns to step 1201.

At step 1219, the first processor 460 determines whether a movement of the electronic device 400 is detected using the sensing information received from the motion sensor 423. Using the sensing information received from the motion sensor 423, the first processor 460 can obtain activity or pedometer information of the user carrying the electronic device 400. When no movement of the electronic device 400 is detected, the first processor 460 returns to step 1201. When movement of the electronic device 400 is detected, the processor performs step 1221.

At step 1221, the first processor 460 determines whether the electronic device 400 moves over a threshold based on the sensing information of the motion sensor 423. The first processor 460 can recognize the user's activity carrying the electronic device 400 using the received sensing information and determine the number of steps (e.g., pedometer information). The first processor 460 can determine the movement of the electronic device 400 based on at least one of the recognized activity and/or the determined steps. When the user of the electronic device 400 runs or moves using a transportation means, such as a bicycle or a vehicle, the first processor 460 can determine that the electronic device 400 moves over the threshold. Upon determining the movement of the electronic device 400 over the threshold, the first processor 460 returns to step 605 of FIG. 6. When determining that the movement of the electronic device 400 is not over the threshold, the first processor 460 returns to step 1201.

Figure 13:
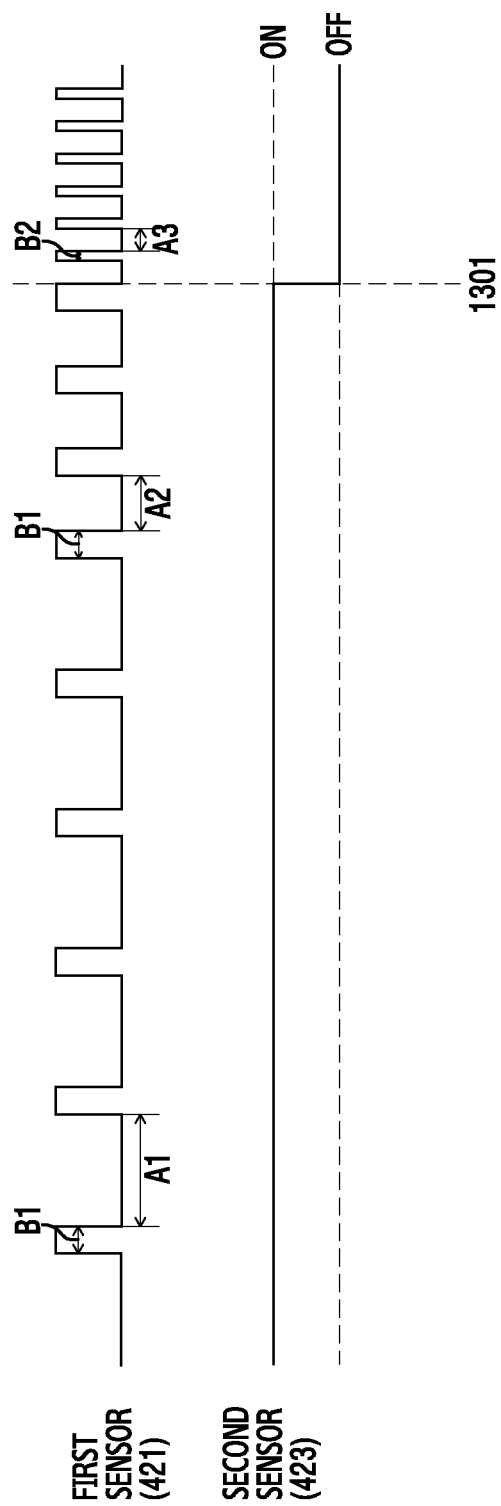
FIG. 13 illustrates operation timings of sensors of an electronic device, according to an embodiment of the present disclosure.

FIG. 13 illustrates operation timings of sensors of an electronic device, according to an embodiment of the present disclosure.

Referring to FIG. 13, operation timings of the proximity sensor 421 and the motion sensor 423 are shown. The proximity sensor 421 determines that a particular object approaches the electronic device 400 at first intervals B1 on a first cycle A1. For example, the first cycle A1 can be one minute, and the first interval B1 can be three seconds. When the first cycle A1 passes three times and the particular object approaches the electronic device 400, the first processor 460 can change the first cycle A1 to the second cycle A2. The second cycle A2 can be 20 seconds, for example. The first processor 460 can determine that the approach of the particular object to the electronic device 400 is maintained at the first intervals B1 on the second cycle A2. As the second cycle A2 passes three times, for example, and the approach 1301 of the particular object to the electronic device 400 is maintained, the first processor 460 can deactivate the display 440. At time 1301, when the approach of the particular object to the electronic device 400 is maintained, the first processor 460 can change the sensing cycle of the proximity sensor 421 to a third cycle A3 and change the first interval B1 to a second interval B2. The third cycle A3 can be one second, and the second interval B2 can be 0.2 seconds, for example.

The proximity sensor 421 can confirm that the particular object approaches to the electronic device 400 at second intervals B2 on the third cycle A3 under the control of the first processor 460. Upon determining the approach of the particular object to the electronic device 400, the first processor 460 can provide first notification information to the second processor 470. The first processor 460 can deactivate the motion sensor 423 after the time 1301 when the approach of the particular object to the electronic device 400 is maintained. The display 440 and the motion sensor 423 can be activated when the proximity to the electronic device 400 is released (e.g., when the electronic device 400 is not hidden by the particular object) according to a sensing result of the proximity sensor 421.

Figure 14:
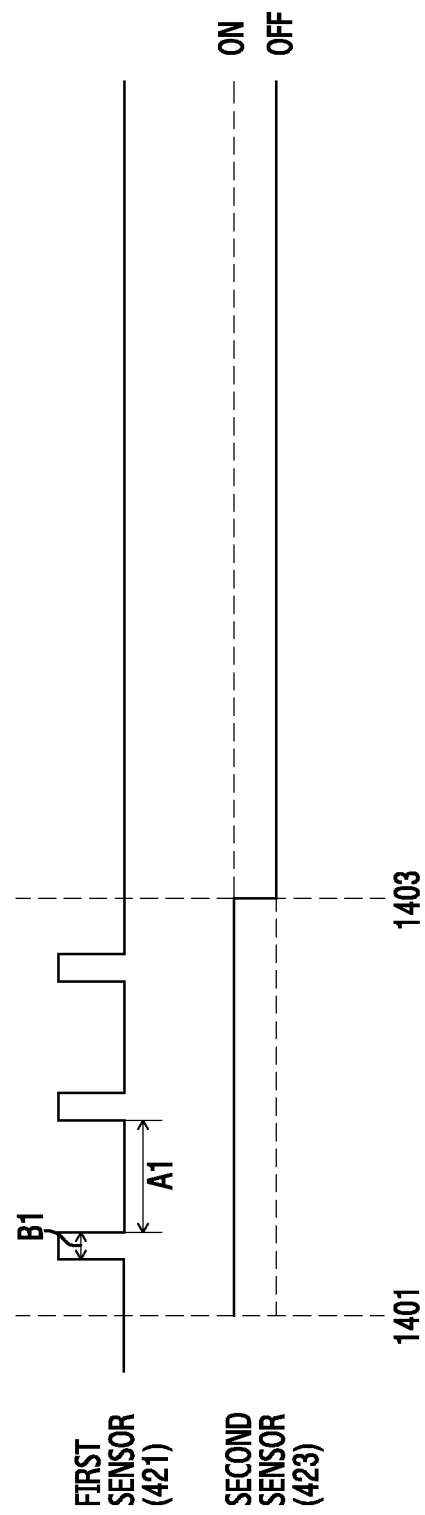
FIG. 14 illustrates operation timings of sensors of an electronic device, according to an embodiment of the present disclosure.

FIG. 14 illustrates operation timings of sensors of an electronic device, according to an embodiment of the present disclosure.

Referring to FIG. 14, operation timings of the proximity sensor 421 and the motion sensor 423 are shown. The motion sensor 423 can check sensing information. The motion sensor 423 can check a movement of the electronic device 400 in real time. The first processor 460 can receive and check the sensing information from the proximity sensor 42) after a time 1401 when the movement of the electronic device 400 is not detected over a certain time. The proximity sensor 421 can determine that a particular object approaches the electronic device 400 at a first interval B1 on a first cycle A1. For example, the first cycle A1 can be one minute and the first interval B1 can be three seconds. The first processor 460 can determine, based on the sensing information, that the particular object approaches the electronic device 400 as the first cycle passes three times, for example. The first processor 460 can deactivate the display 440 and the proximity sensor 421 at a time 1403 when the particular object approaches. The display 440 and the proximity sensor 421 can be re-activated upon detecting a movement of the electronic device 400.

The motion sensor 423 can check a posture change of the electronic device 400. The first processor 460 can check the sensing information of the proximity sensor 421 from the time 1401 when the posture change of the electronic device 400 is detected. Based on the sensing information, the first processor 460 can deactivate the display 440 and the proximity sensor 421 at the time 1403 when the particular object approaches the electronic device 400. The display 440 and the proximity sensor 421 can be re-activated when a posture change of the electronic device 400 is detected according to the sensing information received from the motion sensor 423.

A method for operating an electronic device 400 can include, while a display 440 displays contents, checking, at a first processor 460, state information of the electronic device 400 using a first sensor 421 based on a first cycle, determining, by the first processor 460, whether the state information is maintained using the first sensor 421 based on a second cycle, when determining that the state information is maintained based on the second cycle, providing, by the first processor 460, first notification information corresponding to the determination to a second processor 470, and changing, by the second processor 470, a state of the display in response to the first notification information.

The electronic device 400 can further include a DDI 480, and the method can further include providing the DDI 480 with information about at least part of the contents to display on the display 440, and then entering a sleep mode.

The method can further include, switching, by the second processor 460 in the sleep mode, to a wake-up mode on a periodic basis or based on notification information in order to provide the DDI 480 with the information about at least part of the contents.

Changing the state of the display 440 can further include changing a brightness of the display 440 based on the first notification information notifying not to display or to display the contents on the display 440.

The method can further include, after changing the state of the display 440, determining, by the first processor 460, a change of the state information using the first sensor 421 based on a third cycle, and when determining the change of the state information, providing, by the first processor 460, the second processor 470 with second notification information corresponding to the determination.

The method can further include changing, by the second processor 470, the changed state of the display 440 to an original state based on the second notification information.

The first sensor 421 can include a proximity sensor, the first cycle can exceed the second cycle, and the second cycle can exceed the third cycle.

The method can further include, while the display 440 displays the contents, detecting, by the first processor 460, a posture change of the electronic device using a second sensor 423, when the changed posture is maintained for a preset time, determining, by the first processor 460, the state information using the first sensor 421, and providing, by the first processor 460, the first notification information to the second processor 470 in response to the determination.

The second sensor 423 can include an accelerometer sensor, and the method can further include, when the state of the display 440 is changed, deactivating, by the first processor 460, the first sensor 421, detecting, by the first processor 460, a posture change of the electronic device 400 using the second sensor 423, when detecting the posture change of the electronic device 400, providing, by the first processor 460, the second processor 470 with second notification information corresponding to the determination, and switching, by the second processor 470, the changed state of the display 440 to an original state based on the second notification information.

The method can further include obtaining, by the first processor 460, activity or pedometer information of a user using sensing information of the second sensor 423, and when at least part of the obtained information exceeds a preset threshold, providing the first notification information to the second processor 470.

The electronic device can further include a communication unit 410, and the method can further include receiving, by the second processor 470, at least one state information from at least one other electronic device 400 connected with the communication unit 410 through the communication unit 410, and changing the state of the display 440 which displays the contents based on the at least one state information.

A storage medium stores instructions which when executed by the first and second processors 460 and 470, causes the first and second processors 460 and 470 to perform at least one operation. The at least one operation in an electronic device 400 can include, while a display 440 displays contents, checking, by a first processor 460, state information of the electronic device 400 using a first sensor 421 based on a first cycle, determining, by the first processor 460, whether the state information is maintained using the first sensor 421 based on a second cycle, when determining that the state information is maintained based on the second cycle, providing, by the first processor 460, first notification information corresponding to the determination, to a second processor 470, and changing, by the second processor 470, a state of the display 440 in response to the first notification information.

While the disclosure has been shown and described with reference to certain embodiments, it will be understood by those skilled in the art that various changes in form and details may be made therein without departing from the spirit and scope of the disclosure, which is defined, not by the detailed description and embodiments, but by the appended claims and their equivalents.

What is claimed is:

1. A method for operating an electronic device, comprising:
   while a display displays content, identifying, by a first processor, state information of the electronic device using a first sensor based on a first cycle, wherein when the first cycle has arrived, the first sensor is activated during a designated time;
   determining, by the first processor, whether the state information is maintained using the first sensor based on a second cycle, wherein when the second cycle has arrived, the first sensor is activated during the designated time, and wherein the second cycle is smaller than the first cycle;
   when determining that the state information is maintained based on the second cycle, providing, by the first processor to a second processor, first notification information corresponding to the determination; and
   changing, by the second processor, a state of the display in response to the first notification information.

2. The method of claim 1, further comprising:
   providing, by the second processor, a display driver integrated circuit (DDI) with information about at least part of the content to display on the display, and then entering, at the second processor, a sleep mode.

3. The method of claim 2, further comprising:
   switching, at the second processor in the sleep mode, to a wake-up mode, on a periodic basis or based on notification information, in order to provide the DDI with the information about the at least part of the contents.

4. The method of claim 1, wherein changing the state of the display further comprises:
   changing a brightness of the display based on the first notification information.

5. The method of claim 1, further comprising:
   after changing the state of the display, determining, by the first processor, whether there is a change of the state information using the first sensor based on a third cycle; and
   when determining that there is the change of the state information, providing, by the first processor, the second processor with second notification information corresponding to the determination.

6. The method of claim 5, further comprising:
   changing, by the second processor, the changed state of the display to an original state based on the second notification information.

7. The method of claim 5, wherein the first sensor comprises a proximity sensor,
   the second cycle exceeds the third cycle.

8. The method of claim 1, further comprising:
   while the display displays the content, detecting, by the first processor, a posture change of the electronic device using a second sensor;
   when the changed posture is maintained for a preset time, determining, by the first processor, the state information using the first sensor; and
   providing, by the first processor to the second processor, the first notification information in response to the determination.

9. An electronic device comprising:
   a sensor unit comprising a first sensor and a second sensor;
   a display for displaying content;
   a first processor for controlling the sensor unit; and
   a second processor for controlling the display,
   wherein, while the display displays the content, the first processor:
      identifies state information of the electronic device using the first sensor based on a first cycle, wherein when the first cycle has arrived, the first sensor is activated during a designated time,
      determines whether the state information is maintained using the first sensor based on a second cycle, wherein when the second cycle has arrived, the first sensor is activated during the designated time, and wherein the second cycle is smaller than the first cycle, and
      when determining that the state information is maintained based on the second cycle, provides first notification information corresponding to the determination to the second processor, and
   wherein the second processor changes a state of the display in response to the first notification information.

10. The electronic device of claim 9, further comprising:
    a display driver integrated circuit (DDI),
    wherein the second processor provides the DDI with information about at least part of the contents to display on the display, and then enters a sleep mode.

11. The electronic device of claim 10, wherein the second processor in the sleep mode switches to a wake-up mode, on a periodic basis or based on notification information, in order to provide the DDI with the information about the at least part of the content.

12. The electronic device of claim 9, wherein the second processor changes a brightness of the display based on the first notification information received from the first processor.

13. The electronic device of claim 9, wherein, after changing the state of the display, the first processor determines whether there is a change of the state information using the first sensor based on a third cycle, and when determining that there is the change of the state information, provides the second processor with second notification information corresponding to the determination.

14. The electronic device of claim 13, wherein the second processor changes the changed state of the display to an original state based on the second notification information.

15. The electronic device of claim 13, wherein the first sensor comprises a proximity sensor,
    the second cycle exceeds the third cycle.

16. The electronic device of claim 9, wherein the first processor:
    detects a posture change of the electronic device using a second sensor,
    when the changed posture is maintained for a preset time, determines the state information using the first sensor, and
    provides the first notification information to the second processor in response to the determination, and
    wherein the second processor changes the state of the display in response to the first notification information.

17. The electronic device of claim 16, wherein the second sensor comprises an accelerometer sensor, and
    when the state of the display is changed, the first processor:
       deactivates the first sensor,
       detects the posture change of the electronic device using the second sensor, and
       when detecting the posture change of the electronic device, switches the changed state of the display to an original state using the second processor.

18. The electronic device of claim 9, wherein the first processor obtains activity information or pedometer information of a user using sensing information acquired by the second sensor, and when at least part of the obtained information exceeds a preset threshold, changes the display state.

19. The electronic device of claim 9, further comprising:
a communication unit,
wherein the second processor receives at least one state information from at least one other electronic device connected with the electronic device, through the communication unit, and changes the state of the display based on the at least one state information.

20. A non-transitory, computer-readable recording medium having recorded thereon, instructions, which when executed by at least one processor of an electronic device, perform the steps of:

while a display displays content, identifying, by a first processor, state information of the electronic device using a first sensor based on a first cycle, wherein when the first cycle has arrived, the first sensor is activated during a designated time;

determining, by the first processor, whether the state information is maintained using the first sensor based on a second cycle, wherein when the second cycle has arrived, the first sensor is activated during the designated time, and wherein the second cycle is smaller than the first cycle;

when determining that the state information is maintained based on the second cycle, providing, by the first processor to a second processor, first notification information corresponding to the determination; and changing, by the second processor, a state of the display in response to the first notification information.

\* \* \* \* \*